(12) United States Patent
Osanai

(10) Patent No.: US 6,513,489 B2
(45) Date of Patent: Feb. 4, 2003

(54) IDLE SPEED CONTROL DEVICE FOR INTERNAL COMBUSTION ENGINE AND METHOD OF CONTROLLING IDLE SPEED

(75) Inventor: Akinori Osanai, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/976,110

(22) Filed: Oct. 15, 2001

(65) Prior Publication Data

US 2002/0050269 A1 May 2, 2002

(30) Foreign Application Priority Data

Oct. 31, 2000 (JP) .................................... 2000-332546

(51) Int. Cl.$^7$ .................................................. F02M 3/00
(52) U.S. Cl. ............................. 123/339.11; 123/339.16
(58) Field of Search ...................... 123/339.11, 339.16, 123/339.17, 339.18, 419, 436

(56) References Cited

U.S. PATENT DOCUMENTS

| | | | | |
|---|---|---|---|---|
| 4,658,782 A | * | 4/1987 | Lefevre et al. | 123/339.21 |
| 5,000,147 A | * | 3/1991 | Hill | 123/339.11 |
| 5,445,124 A | * | 8/1995 | Tomisawa et al. | 123/339.11 |
| 5,662,084 A | * | 9/1997 | Deguchi et al. | 123/339.11 |
| 5,727,522 A | * | 3/1998 | Otani et al. | 123/339.11 |
| 5,975,049 A | * | 11/1999 | Kawasaki | 123/339.12 |
| 6,223,723 B1 | * | 5/2001 | Ito | 123/406.51 |
| 6,276,131 B1 | * | 8/2001 | Ueno et al. | 60/285 |

FOREIGN PATENT DOCUMENTS

| | | |
|---|---|---|
| JP | A 05-106487 | 4/1993 |
| JP | A 07-063149 | 3/1995 |

* cited by examiner

Primary Examiner—Carl S. Miller
(74) Attorney, Agent, or Firm—Oliff & Berridge, PLC

(57) ABSTRACT

An idle speed control device for an internal combustion engine controls an idle speed of the internal combustion engine by at least one of an amount of intake air and an ignition timing during application of an external load. The control device calculates a target amount of air corrected by the external load, estimates a transient speed of the internal combustion engine when changing the amount of intake air to the target amount of air, and further corrects the amount of intake air or corrects the ignition timing on the basis of a difference between the estimated speed and the actual speed of the internal combustion engine at the timing when the speed is estimated, in such a manner as to reduce the difference. If the external load changes, the control device corrects the amount of intake air so as to maintain the engine speed, and prevents the engine speed from fluctuating due to a delay of response in such a case.

18 Claims, 16 Drawing Sheets

FIG. 7
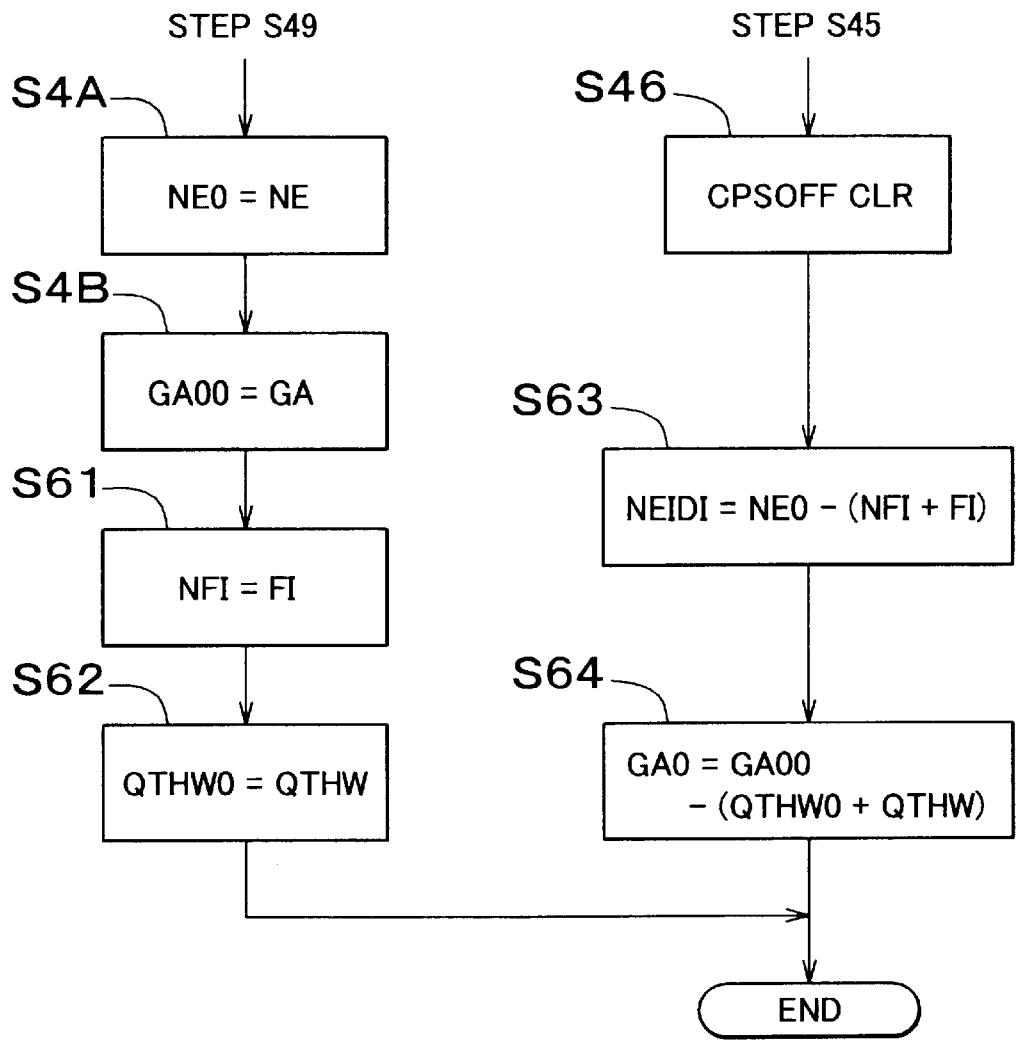
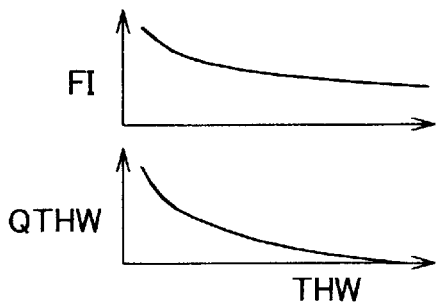

IDLE SPEED CONTROL DEVICE FOR INTERNAL COMBUSTION ENGINE AND METHOD OF CONTROLLING IDLE SPEED

INCORPORATION BY REFERENCE

The disclosure of Japanese Patent Application No. 2000-332546 filed on Oct. 31, 2000 including the specification, drawings, and abstract is incorporated herein by reference in its entirety.

BACKGROUND OF THE INVENTION

1. Field of the Invention

The invention relates to a device for controlling the idle speed of an internal combustion engine such as a gasoline engine or the like. More particularly, the invention relates to a device for maintaining an idle speed in the case of fluctuations in external load. The invention also relates to a method of controlling the idle speed.

2. Description of Related Art

For starting an internal combustion engine such as a gasoline engine, it is required not only to be supplied with fuel but also to be forcefully rotated by an external force. Accordingly, even if a vehicle equipped with the engine requires no power, for example, because it is stopped, the internal combustion engine continues to rotate in preparation for subsequent takeoff. This is an idling state in which the engine speed (idle speed) is set as a lowest possible speed within such an extent that the engine does not come into a stall (i.e. within such an extent that engine stall does not occur). To be more precise, the idle speed is maintained by setting a target speed in accordance with the state of warm-up, the state of a load ascribable to auxiliaries, and so on and subjecting the amount of intake air to feedback control on the basis of a difference between the target speed and an actual speed.

Feedback control is performed with a view to changing the amount of intake air in response to a change in actual speed and generation of a difference between the actual speed and the target speed. Therefore, such a speed as will not cause engine stall despite a temporary drop in speed is set as a target speed during idling. For this reason, the constant idle speed is set as a speed slightly higher than a lowest speed capable of maintaining autonomous rotation. Because the amount of fuel consumption increases correspondingly, there is room for an improvement in fuel consumption.

The idle speed is set as a relatively high speed as described above with the intention of preventing the engine from coming into a stall due to a temporary drop in engine speed. Thus, once the idle speed is stabilized, it can be further reduced to the extent of achieving an improvement in fuel consumption. The change in idle speed is mainly caused by fluctuations in external load ascribable to the auxiliaries or the like. Hence, in general, various control operations corresponding to fluctuations in external load are performed for the purpose of stabilizing the idle speed.

That is, an internal combustion engine mounted in a vehicle is connected to auxiliaries such as a hydraulic pump of a power steering device, a compressor for air-conditioning, and so on. Therefore, if these auxiliaries are operated, the internal combustion engine may be exposed to a load and drop in speed even during idling. Thus, if such a load ascribable to the auxiliaries arises, the amount of intake air is increased in accordance with the load so as to maintain the idle speed. Such correction of the load ascribable to the auxiliaries is realized not by feedback control but by feedforward control.

In the case where the amount of intake air is increased or reduced due to an increase or decrease in the external load, the space extending from a throttle valve or an ISC (idle speed control) valve to an intake port of each cylinder occupies a large volume even if the opening of the valve is changed. Thus, the amount of air actually sucked into each cylinder and consumed for combustion changes with a predetermined delay with respect to a change in opening of the valve. Namely, even if the opening of the valve is changed due to an increase in the external load, the amount of intake air increases with a delay so that the speed of the internal combustion engine drops temporarily. On the contrary, in the case where the opening of the valve is reduced due to a decrease in external load, the amount of intake air decreases with a delay with respect to the decrease in external load, so that the output of the internal combustion engine becomes relatively large as compared with the external load. As a result, the speed of the internal combustion engine increases temporarily. In such a case where the amount of intake air is increased or reduced on the basis of an external load (load ascribable to the auxiliaries), the speed of the internal combustion engine becomes unstable as a result of an unavoidable delay.

In order to prevent the speed of the internal combustion engine from increasing or decreasing due to a delay of change in the amount of intake air, the invention disclosed in Japanese Patent Application Laid-Open No. 7-63149 is designed to change the amount of intake air in accordance with changes in external load while performing correction so as to advance or retard the ignition timing in accordance with actual changes in the amount of intake air, thus redressing a delay of changes in the output torque of the internal combustion engine and preventing the speed of the internal combustion engine from increasing or decreasing temporarily. To be more precise, estimation of a required torque is made from an increase in the amount of intake air in the case of fluctuations in external load. Then, calculation of a correction amount of the ignition timing is made in accordance with the estimated torque.

As disclosed in the aforementioned publication, if the ignition timing is subjected to correction for advancement so as to compensate for the torque in response to generation of an external load or an increase in external load, it is necessary to ensure a certain width of advancement in advance. Thus, the ignition timing needs to be retarded when no load is being applied. This may lead to a deterioration in fuel consumption during idling. Further, since estimation of a load torque is made and calculation of a correction amount of the ignition timing is then made on the basis of the result of estimation, the actual amount of advancement or retardation of the ignition timing to be corrected may become excessive or insufficient. This may constitute an obstacle to stabilization of the speed of the internal combustion engine.

In particular, the output torque of the internal combustion engine changes depending on the speed even on the condition that the amount of intake air be the same. Hence, simple control for achieving a target torque demonstrates a control sensitivity that varies in accordance with the engine speed. During idling in which a change in torque causes an immediate change in speed, there occurs an increased error in correction. Consequently, control of the engine speed suffers the phenomenon of hunting, so that the engine speed becomes unstable.

Further, in view of a control delay of the amount of intake air, it is also possible to further correct the amount of air instead of correcting the ignition timing as described above. However, the correction does not reflect the actual amount of air in the intake pipe. Therefore, the amount of correction becomes excessive if the external load is turned on and off repeatedly. This may cause unstableness in the speed of the internal combustion engine.

SUMMARY OF THE INVENTION

The invention has been made as a solution to the aforementioned technical problems. It is an object of the invention to provide a device capable of suppressing changes in idle speed resulting from fluctuations in external load and further stabilizing the idle speed.

In order to achieve the above-mentioned object, the invention is designed to make a determination on a transient state of the engine speed by estimating a speed of the internal combustion engine in the case where the amount of intake air is corrected in response to a change in external load, and to further reduce the amount of intake air or correct the ignition timing on the basis of the result of determination.

An idle speed control device and a method of controlling an idle speed of an internal combustion engine according to a first aspect of the invention are designed to perform control of an idle speed of the internal combustion engine by at least one of an amount of intake air and an ignition timing during application of an external load. It is preferable that calculation of a target amount of intake air corrected in response to fluctuations in external load in an idling state of the engine be made, that estimation of a transient speed of the internal combustion engine be made in the case where the amount of intake air is changed to the target amount, and that on the basis of a difference between the estimated speed and the actual speed of the internal combustion engine at that moment, at least one of the amount of intake air and the ignition timing is corrected in such a manner as to reduce the difference. Thus, in the case of fluctuations in external load, the amount of intake air corresponding to the external load is set. In a transient state where the engine assumes an operational state corresponding to the amount of intake air, the amount of intake air or the ignition timing is corrected. Thus, the speed of the internal combustion engine is controlled so as to be maintained at the estimated speed, namely, the speed to be achieved.

As a result, it is possible to suppress fluctuations in output torque of the internal combustion engine resulting from a delay of change in the amount of intake air based on the external load or to suppress changes in speed of the internal combustion engine associated with fluctuations in external load, so that the idle speed of the internal combustion engine can be stabilized.

Further, it is also possible to estimate a transient speed of the internal combustion engine on the basis of the target amount of air, the actual amount of intake air at that moment, and a target idle speed.

Further, it is also possible to estimate a transient speed of the internal combustion engine on the basis of a target torque corresponding to an external load and an actual amount of intake air at that moment.

Thus, if the speed for achieving the target torque corresponding to the external load is estimated, and if the amount of intake air or the ignition timing is corrected such that the actual speed becomes equal to the estimated speed, the output torque of the internal combustion engine is unlikely to become excessive or insufficient even in the case of fluctuations in external load. Thus, it is possible to stabilize the idle speed.

Furthermore, in the case where the output torque of the internal combustion engine is reduced, the ignition timing may be controlled in such a manner as to be retarded.

This construction is designed such that the output torque of the internal combustion engine is reduced due to retardation control of the ignition timing, thus making it possible to improve the control response of the output torque and to further stabilize the idle speed.

Further, an idle speed control device according to a second aspect of the invention is designed to control an idle speed of an internal combustion engine by at least one of an amount of intake air and an ignition timing during application of an external load. It is preferable that calculation of a target amount of air corrected on the basis of fluctuations in external load in an idling state be made, that estimation of a transient speed of the internal combustion engine be made in the case where the amount of intake air is changed to the target amount of air, and that the ignition timing be corrected in such a manner as to suppress an increase in the transient speed of the internal combustion engine.

In this case, it is possible to obtain a relation among the engine speed, the amount of air, and the correction amount of the ignition timing through an experiment conducted during actual operation of the engine. Because the idle speed is controlled on the basis of the experimental data, the precision in correcting the ignition timing is enhanced. As a result, it becomes possible to inhibit or prevent the engine speed from fluctuating.

BRIEF DESCRIPTION OF THE DRAWINGS

FIG. 7 is a partial flowchart of a routine shown in FIG. 5, illustrating a control example in which reference values for engine speed and intake air amount are set while the engine speed is changing.

DETAILED DESCRIPTION OF PREFERRED EMBODIMENTS

Figure 16:
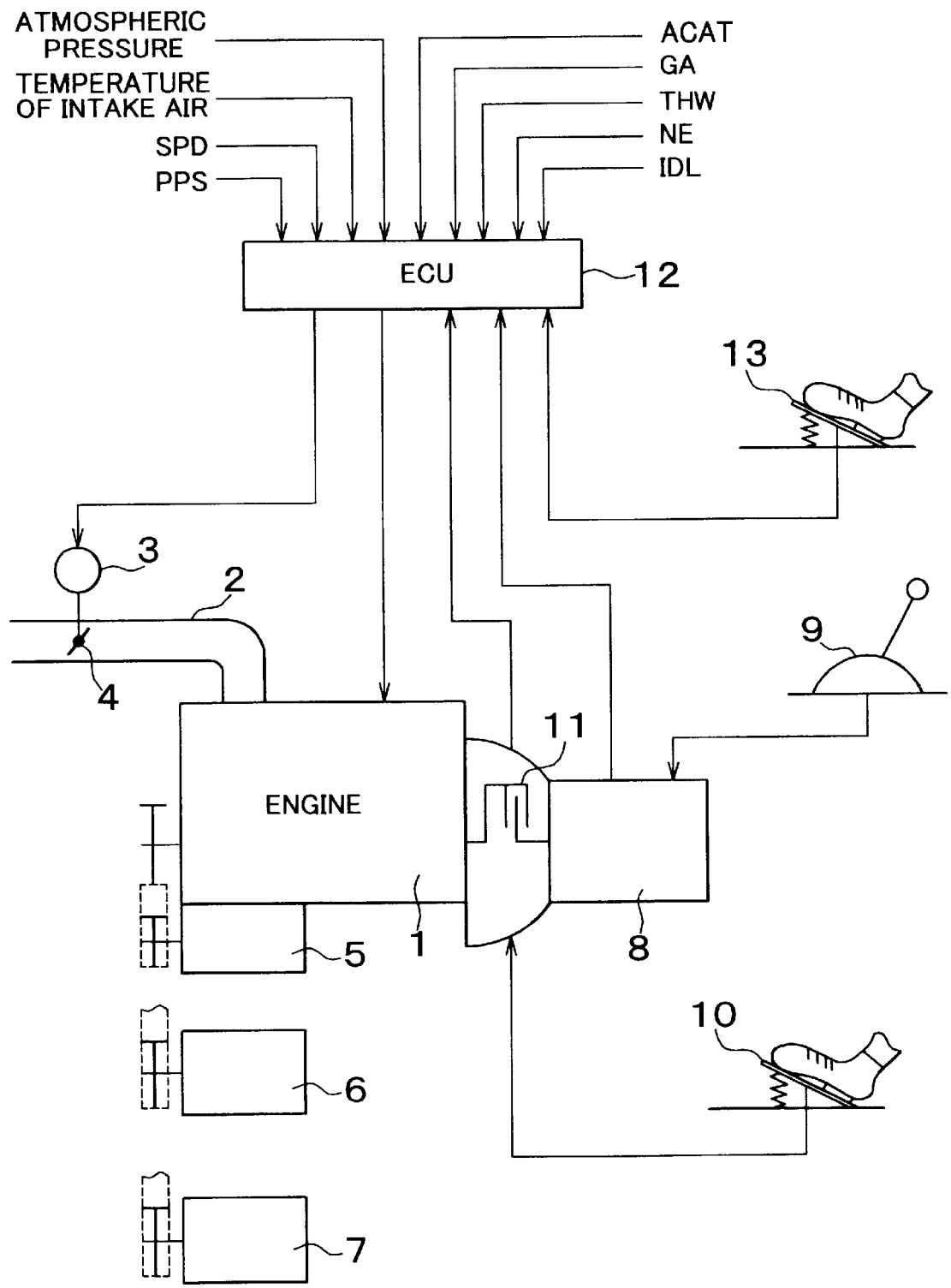
FIG. 16 is a schematic diagram illustrating in a simplified manner an internal combustion engine of the invention and a control system thereof.

Hereinafter, the invention will be described on the basis of concrete examples shown in the drawings. First of all, an internal combustion engine to which the invention is applied will be described. In short, the internal combustion engine to which the invention is applied is a prime mover that burns supplied fuel so as to output power, namely, a gasoline engine, a diesel engine, or the like. In order to be started, the internal combustion engine must be forcefully rotated by an external force. Thus, the internal combustion engine is maintained in an idling state if a vehicle mounted therewith is stopped. FIG. 16 illustrates an example of the internal combustion engine. The example shown herein employs a gasoline engine 1 (hereinafter referred to simply as the engine). An intake pipe 2 of the engine 1 has large-capacity hollow portions such as a surge tank (not shown) and so on. Further, the intake pipe 2 is provided with an electronic throttle valve 4, which is opened and closed by an electrically controlled actuator 3 such as a motor.

Further, although not shown in the drawings, the engine 1 is provided with a fuel supply system capable of electrically controlling an amount of fuel supply (or fuel injection amount) or an ignition device capable of advancing or retarding a timing for igniting the mixture sucked into each cylinder with respect to the top dead center of a piston. In addition, auxiliaries such as a hydraulic pump (power steering pump) 5 of a power steering device, a compressor 6 of an air-conditioner, an alternator 7, and so on are connected to the engine 1. These auxiliaries are driven by power from the engine 1.

Still further, a transmission 8 is connected to an output side of the engine 1. In the example shown in the drawings, the transmission 8 is a manual transmission and is designed such that a shift device 9 such as a shift lever or the like sets a change gear ratio (change gear stage). Furthermore, the transmission 8 is connected to the engine 1 via a clutch 11, which is engaged and released (turned on and off) by a clutch pedal 10.

An electronic control unit (ECU) 12 for controlling the engine 1 is provided. The electronic control unit 12 is mainly constructed of a microcomputer, and is designed to perform calculation on the basis of inputted signals, prestored data, and programs, and to control the engine 1 on the basis of the result of calculation. The inputted signals include a signal from an idle switch (IDL) that is turned on in an idling state, an accelerator opening TA indicating an amount of depression of an accelerator pedal 13, a neutral signal indicating whether or not the transmission 8 is in a neutral state, an on-off signal indicating an engaged or released state of the clutch 11, a signal indicating an engine speed NE, a signal indicating a temperature THW of engine coolant, a signal indicating an amount GA of intake air, a signal indicating an atmospheric pressure, a signal indicating a temperature of intake air, a signal indicating a vehicle speed SPD, an amount ACAT of retardation for warming up an exhaust gas purification catalyst disposed in an exhaust system of the engine 1, and a hydraulic pressure PPS of a power steering pump 5. On the basis of these data thus inputted, control of an opening of the electronic throttle valve 4, an amount of fuel supply (fuel injection amount), and an ignition timing is performed.

Figure 1:
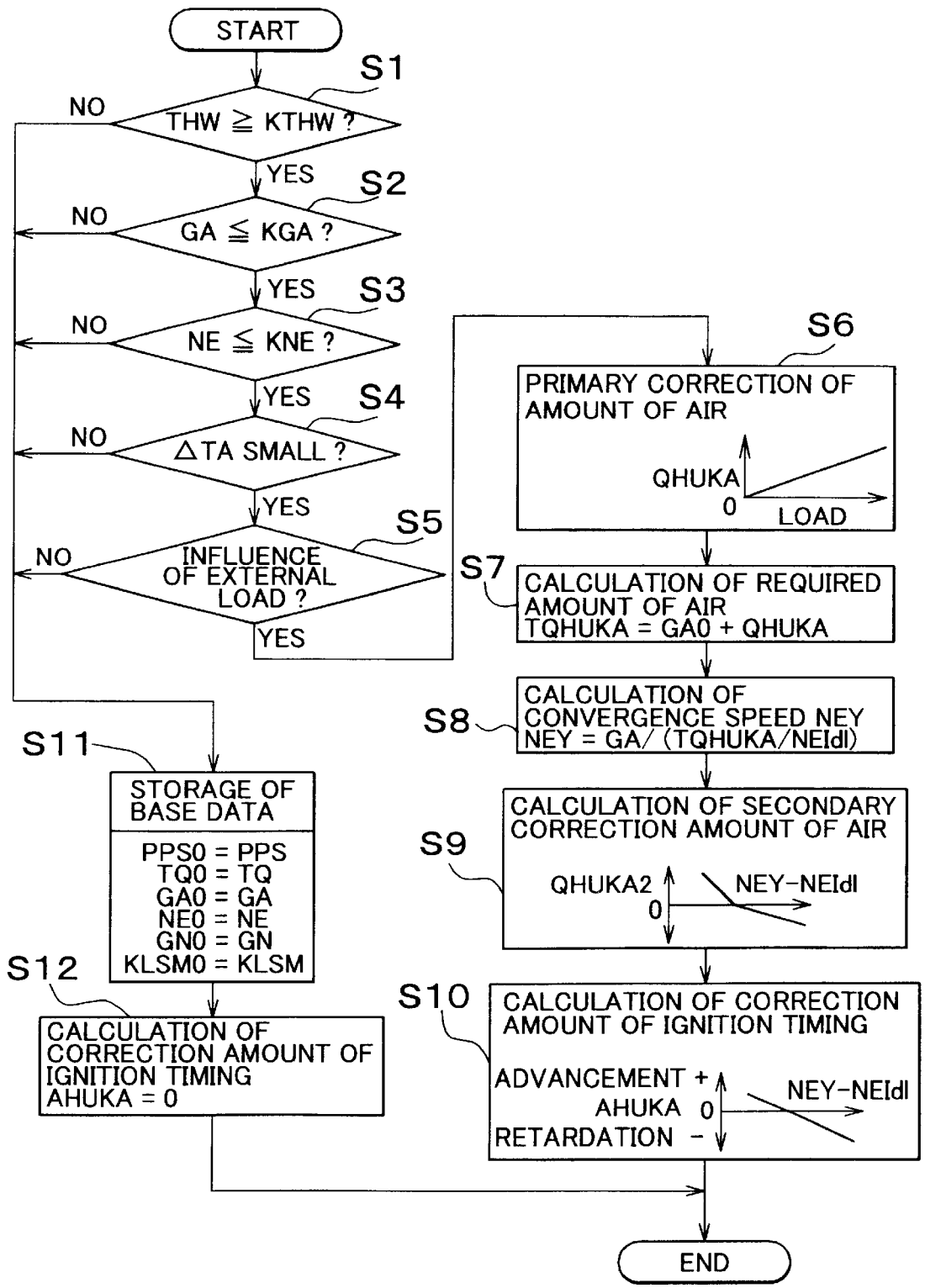
FIG. 1 is a flowchart illustrating an example of control performed by a control device of the invention.

For the purpose of stabilizing the idle speed, the control device of the invention, which is mainly constructed of the electronic control unit 12, is designed to perform control as will be described below if the external load fluctuates. FIG. 1 is a flowchart illustrating an example of such control, which is performed at intervals of a predetermined short period. This control example is designed to estimate an engine speed during correction of a load by an amount of air and to transiently perform so-called secondary correction on the basis of the estimated speed and a target idle speed.

To be more precise, it is determined whether or not the temperature THW of engine coolant is equal to or higher than a reference temperature KTHW (step S1), for example, if a vehicle mounted with the engine 1 is stopped while the engine is in an idling state. If the engine 1 is being warmed up, the amount of intake air is increased so that the engine speed NE is maintained higher than an engine speed corresponding to a steady idling state. This is because the engine speed NE hardly drops to the extent of causing engine stall even if the external load increases.

If the result in step S1 is positive because of completion of the warming-up of the engine 1, it is determined whether or not an actual amount GA of intake air is equal to or smaller than a predetermined reference amount KGA (step S2). This determination is made because of the following reason. That is, if the amount GA of intake air is equal to or smaller than the reference amount KGA, the engine 1 outputs a small torque so that application of an external load such as the power steering pump 5 or the like exerts a great influence on the engine speed NE. On the contrary, if the amount GA of intake air is larger than the reference amount KGA, the external load does not exert a marked influence because the engine torque is relatively large. Thus, the degree of necessity to correct the load differs between these two cases.

If the result in step S2 is positive because of a small engine torque, it is determined whether or not an actual engine speed NE at that moment is equal to or lower than a reference speed KNE (step 3). This determination is made because of the following reason. If the engine speed NE is equal to or lower than the reference speed KNE, the engine 1 may come into a stall through a slight drop in engine speed. On the contrary, if the engine speed NE is high, the engine is unlikely to come into a stall. Thus, such an amount of drop in engine speed as causes engine stall, namely, so-called engine stall resistance differs depending on the engine speed NE.

If the result in step S3 is positive because of the engine speed NE that is low enough to cause engine stall, it is determined whether or not the amount ΔTA of change in the opening TA of the accelerator is small (step S4). This determination can be made, for example, depending on whether or not a difference in the opening TA of the accelerator within a predetermined period is equal to or smaller than a predetermined value. In general, if the engine is in an idling state or a steady running state, the accelerator pedal (not shown) is kept retracted or maintained in a certain state of depression. After all, it is determined in step S4 whether or not the engine is in an idling state (a flag XIDL=ON) or a steady running state.

If the result in step S4 is positive, it is determined whether or not an external load such as the power steering pump 5 or the like exerts an influence on the engine speed (step S5). This determination can be made, for example, by determining whether or not a flag XPS indicating that the power steering pump 5 is in operation is ON, whether or not no more than a predetermined time has elapsed since the turnoff of the power steering pump 5, whether or not the amount GA of intake air or the load GN is greater than a reference value by a predetermined amount or more.

If the result in step S5 is positive on the ground that the external load exerts an influence on the engine speed, calculation of an amount of increase in intake air corresponding to the load, namely, a primary correction amount QHUKA of air is made (step S6). The primary correction amount QHUKA of air is an increase in the amount of air required to maintain a previously determined engine speed (idle speed) under application of an external load. For example, the primary correction amount QHUKA of air can be calculated from a two-dimensional map that is prepared in advance and that uses the load as a parameter. FIG. 1 schematically shows an example of the map.

Then, calculation of a required amount TQHUKA of air is made using the primary correction amount QHUKA of air (step S7). That is, the required amount TQHUKA of air is calculated by adding the primary correction amount QHUKA of air to a so-called reference amount GA0 of air immediately before generation of an external load or such an increase in external load as exerts a great influence on the engine speed.

Estimation of an engine speed (convergence speed) NEY at a subsequent timing is made using the required amount TQHUKA of air and an actual amount GA of intake air at that moment (step S8). To be more precise, the product of the amount GA of intake air at that moment and an idle speed NEIdl at that moment is divided by the required amount TQHUKA of air, whereby the engine speed NEY (=GA/(TQHUKA/NEIdl)) at the subsequent timing is calculated.

The degree of deficiency or excess in the amount of air increases in proportion to an increase in difference between the estimated speed NEY thus calculated and the idle speed NEIdl. Thus, the amount of intake air is subjected to secondary correction (step S9). That is, calculation of a difference between the estimated speed NEY and the idle speed NEIdl (NEY−NEIdl) is made. The secondary correction amount QHUKA2 of air, which is to be added to the primary correction amount QHUKA of air, is set as a value that increases in proportion to a decrease in the difference from a predetermined value. On the contrary, the secondary correction amount QHUKA2 of air, which is to be subtracted from the primary correction amount QHUKA of air, is set as a value that increases in proportion to an increase in the difference from the predetermined value. The secondary correction amount QHUKA2 of air can be calculated, for example, on the basis of a map that is prepared in advance. FIG. 1 schematically shows an example of the map.

The amount of intake air is subjected to the aforementioned secondary correction so as to correct a transient delay of control resulting from changes in volume of the intake pipe, changes in air pressure, or the like in the case where the amount of intake air is changed in accordance with changes in external load. Correction of the ignition timing is a means for performing substantially the same function as the aforementioned secondary correction. That is, the engine torque increases if the ignition timing is advanced, whereas the engine torque decreases if the ignition timing is retarded. In consideration of this fact, calculation of a correction amount AHUKA of the ignition timing is made on the basis of the aforementioned difference in engine speed (NEY−NEIdl) (step S10). To be more precise, the correction amount of advancement for increasing the engine torque is set as a value that increases as the difference (NEY−NEIdl) between the estimated speed NEY and the idle speed NEIdl decreases from a predetermined value. On the contrary, the correction amount of retardation for reducing the engine torque is set as a value that increases in proportion to an increase in the difference from the predetermined value. The correction amount can be calculated, for example, on the basis of a map that is prepared in advance. FIG. 1 schematically shows an example of the map.

If the result of any one of the above-mentioned steps S1 to S5 is negative, there is no need to correct an engine torque on the basis of an external load. Then, at that moment, a hydraulic pressure PPS of the power steering pump 5, an engine torque TQ, an amount GA of intake air, an engine speed NE, a load GN, and a load factor KSLM representing an amount of intake air per rotation are stored as reference values (base data) PPS0, TG0, GA0, NE0, GN0, and KSLM0 respectively (step S11). Then, the correction amount AHUKA of the ignition timing is reset as zero (step S12).

Thus, the aforementioned control shown in FIG. 1 is designed to correct the amount of intake air on the basis of an external load with a view to maintaining the engine speed in response to generation of the external load or an increase in the external load, and to perform feedforward control of the engine 1 on the basis of the corrected amount of air. In this case, since the substantial amount of air supplied to the cylinders increases after a certain amount of air fills up the intake pipe 2, a transient delay is caused. However, the aforementioned control is designed to detect the transient state as the estimated speed mentioned above and to subject the amount of intake air to secondary correction in accordance with the transient state thus detected. As a result, a delay of response for correcting the amount of intake air (i.e. engine output) with respect to the external load is redressed or suppressed. Thus, the engine speed (idle speed) is stabilized. Such a situation also arises in the case where the amount of intake air is reduced in response to elimination of an external load. Thus, the engine speed is prevented from further decreasing as a transient state or the engine is prevented from coming into a stall due to such a decrease in engine speed even if the idle speed is set as a low engine speed. Thus, it is possible to reduce the idle speed and improve fuel consumption.

Further, the aforementioned control shown in FIG. 1 is designed to correct the ignition timing in such a direction as to redress a transient delay in the amount of intake air, on the basis of a difference between the estimated speed and the idle speed, namely, on the basis of the transient state of correction of the amount of intake air with respect to the external load. Thus, it is possible to prevent a delay in control of the engine torque or fluctuations in engine speed resulting from such a delay. Consequently, the engine becomes unlikely to come into a stall. Therefore, it becomes possible to reduce the idle speed and improve fuel consumption.

Furthermore, the control example shown in FIG. 1 is designed to store an amount of air, an engine speed and so on before generation of an external load as base data, and to perform correction on the basis of the base data. Thus, it is possible to suppress fluctuations in engine speed at the time of generation of an external load even if the engine undergoes a first idle process so as to be warmed up. Moreover, the estimated speed in a transient state is calculated on the basis of the actual amount of intake air at that moment. Hence, the amount of intake air is prevented from being corrected excessively even in a state where the external load is increased and reduced (ON-OFF) repeatedly. Also in this respect, it is possible to reduce the amount of consumption of fuel and improve fuel consumption.

The aforementioned control example is designed to calculate the estimated speed on the basis of the amount of intake air, and to subject the amount of intake air to so-called secondary correction on the basis of the estimated speed. Thus, it is possible to perform control with a substantially reduced error. In particular, the engine torque is unlikely to increase despite advancement of the ignition timing if the amount of intake air is small, namely, if the engine is in a so-called hot idling state. However, if the engine torque is set in accordance with the external load by subjecting the amount of intake air to secondary correction as described above, it becomes possible to more effectively suppress fluctuations in engine speed resulting from the external load.

In order to redress a delay of response in the case where the amount of intake air is corrected on the basis of the external load, the control device of the invention is designed to make a determination on a transient state by estimating an engine speed and to subject the amount of air to secondary correction on the basis of the estimated speed. The aforementioned example shown in FIG. 1 is designed to estimate the engine speed as the transient state on the basis of the required amount of air, the actual amount of air, and the idle speed. Alternatively, it is also possible to carry out estimation on the basis of the torque and to subject the amount of intake air to secondary correction.

Figure 2:
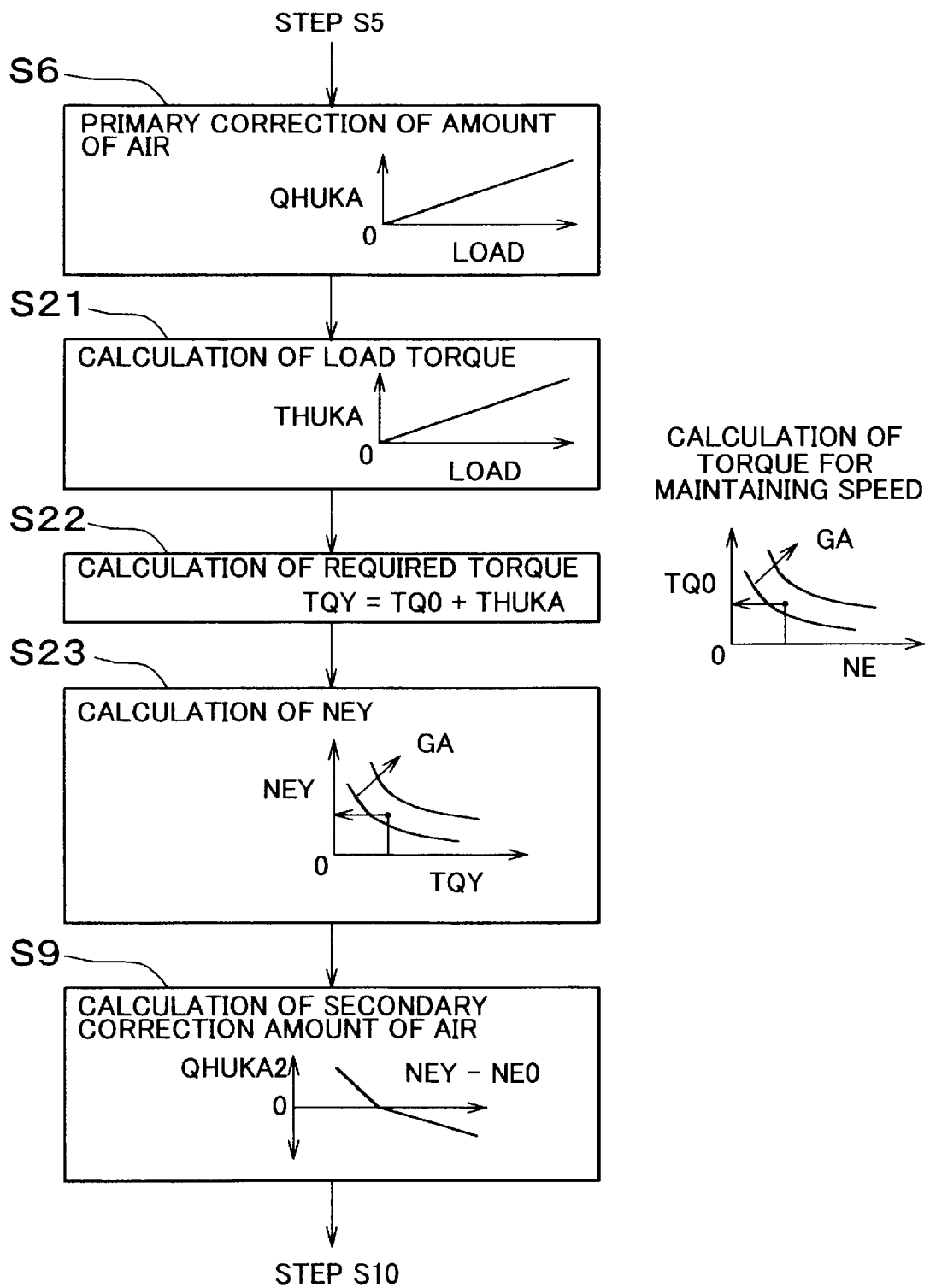
FIG. 2 is a partial flowchart of a control routine shown in FIG. 1, illustrating an example in which estimation of an engine speed is made on the basis of an amount of air instead of a load torque.

FIG. 2 shows such a control example. FIG. 2 shows a partial flowchart that is substituted for steps S7 and S8 in the flowchart shown in FIG. 1. After the primary correction amount QHUKA of air is calculated in the aforementioned step S6, calculation of a load torque THUKA is made on the basis of a load (step S21). For example, the load torque THUKA is a torque corresponding to a discharge pressure PS of the power steering pump 5. The torque required to maintain the engine speed increases in proportion to an increase in load. Thus, it is possible to find a relation between the torque and the load in advance and calculate a load torque on the basis of an external load that has been detected. The load torque can be calculated, for example, on the basis of a map that is prepared in advance. FIG. 2 schematically shows an example of the map.

Calculation of a required torque TQY is made by adding the load torque THUKA to the reference torque TG0 (step S22). The reference torque TQ0 is a torque for maintaining the engine speed NE immediately before generation of an external load. The reference torque TQ0 can be calculated on the basis of the engine speed NE and the amount GA of intake air at that moment. That is, a certain correlation is established between the amount GA of intake air and the output from the engine 1. Further, since the output is the product of the torque and the engine speed, mapping representation of the engine speed NE, the torque TG0, and the amount GA of intake air results in a three-dimensional map beside the flowchart shown in FIG. 2. Accordingly, the reference torque TG0 can be calculated by detecting an engine speed NE immediately before generation of an external load and an amount GA of intake air at that moment and referring to the results of detection and the three-dimensional map beside the flowchart shown in FIG. 2.

If the required torque is thus calculated, calculation of an estimated speed NEY is made on the basis of the three-dimensional map showing a relation among the torque, the engine speed, and the amount of air (step S23). FIG. 2 schematically shows an example of the map. Because the estimated speed (the convergence speed shown in FIG. 1) NEY can be thus calculated, the secondary correction amount QHUKA2 of air is calculated in the aforementioned step S9 on the basis of a difference between the estimated speed NEY and the reference speed NE0 at the time when the external load is off (i.e. the idle speed NEIdl).

Thus, the amount of air is corrected by an amount corresponding to the external load as shown in FIG. 2, and the amount of intake air is subjected to secondary correction in accordance with a difference in torque associated with a substantial delay in increase of the amount of air resulting from the volume of the intake pipe 2 and in accordance with an actual difference in torque between the target torque and the actual torque that gradually changes. Therefore, the engine speed NE can be stably maintained at the target engine speed. While preventing the engine stall resistance from being adversely affected thereby, the idle speed is reduced so as to achieve an improvement in fuel consumption. Further, it is possible to prevent a rise in engine speed or a deterioration in fuel consumption resulting therefrom. Furthermore, if the torque is calculated on the basis of the amount of intake air and the engine speed as described above, it is possible to perform control without necessitating a torque sensor and to achieve cost reduction of the control device.

Figure 3:
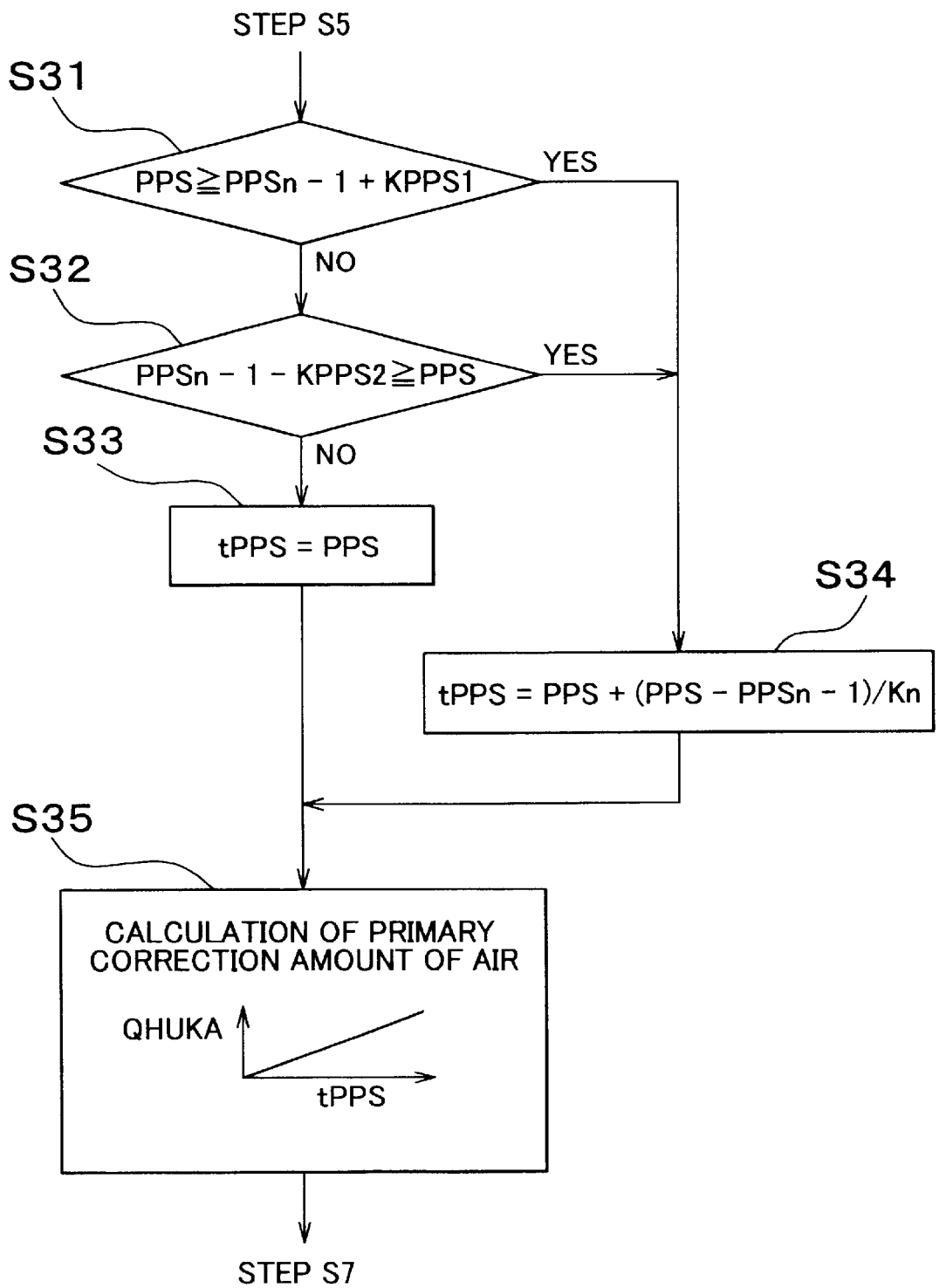
FIG. 3 is a partial flowchart of the control routine shown in FIG. 1, illustrating an example in which calculation of a primary correction amount of air is made differently depending on whether the magnitude of changes in external load is great or small.

For example, the aforementioned external load is a load ascribable to operation of the power steering pump 5. Thus, if an operation such as continuous increase in the amount of steering or the like is performed, the external load changes continuously and greatly. In such a case, it is preferable that primary correction of the amount of air be performed on the basis of the change in external load. FIG. 3 shows such an example.

FIG. 3 is a partial flowchart that is substituted for step S6 in the flowchart shown in FIG. 1, illustrating an example in which the hydraulic pressure PPS of the power steering pump 5 is applied as an external load. That is, if the power steering pump 5 is turned on so that an external load is generated, it is determined whether or not the hydraulic pressure PPS, which is detected at intervals of a cycle time for executing the routines shown in FIGS. 1 and 3, is higher than a last value PPSn−1 by a predetermined value KPPS1 or more, namely, whether or not the detected hydraulic pressure PPS is equal to or higher than a pressure obtained by adding the predetermined value KPPS1 to the last-detected hydraulic pressure PPSn−1 (step S31). If the result in step S31 is negative, namely, if the increase in hydraulic pressure PPS during the aforementioned cycle time is not equal to or higher than the predetermined value KPPS1, it is determined whether or not the detected hydraulic pressure PPS is lower than the last-detected hydraulic pressure PPSn−1 by a predetermined value KPPS2 or more, namely, whether or not the detected hydraulic pressure PPS is equal to or lower than a pressure obtained by subtracting the predetermined value KPPS2 from the last-detected hydraulic pressure PPSn−1 (step S32).

If the result in step S32 is negative, the change in the hydraulic pressure PPS as an external load is within a range defined by the aforementioned two predetermined values KPPS1 and KPPS2. In other words, the change in external load is relatively small. In this case, the detected hydraulic pressure PPS is adopted as a calculation load value tPPS for calculation of the primary correction amount QHUKA of intake air (step S33). Then, the primary correction amount QHUKA of air is calculated on the basis of the load value tPPS for calculation (step S35). It is appropriate that a relation between the load value tPPS for calculation and the primary correction amount QHUKA of air be found in advance as a map, for example, as shown in FIG. 3, and that the primary correction amount QHUKA of air be calculated from the map.

On the other hand, if the result in step S31 or S32 is positive because of a great change in the hydraulic pressure PPS as an external load, a pressure which takes the change in the hydraulic pressure PPS into account is adopted as the calculation load value tPPS (step S34). That is, the change (PPS−PPSn−1) in the hydraulic pressure PPS within the aforementioned cycle time is divided by a suitable value Kn, and a value obtained by adding the quotient to the detected hydraulic pressure PPS (PPS+(PPS−PPSn−1)/Kn) is adopted as the calculation load value tPPS. Thereafter the process proceeds to the aforementioned step S35 where the primary correction amount QHUKA of air is calculated on the basis of the load value tPPS for calculation.

Thus, the primary correction amount QHUKA of air thus calculated represents the amount of air corresponding to an external load at a timing that is ahead of a timing of detection of the hydraulic pressure PPS as an external load by a predetermined time. Therefore, even if the external load increases rapidly, it becomes possible to perform control including a change in load during a period from determination of a load to control of the amount of air, and to stabilize the engine speed. Further, as has been described with reference to FIG. 1, the required amount TQHUKA of air is calculated using the primary correction amount of air, and the convergence speed NEY, the secondary correction amount QHUKA2 of air, and the correction amount AHUKA of the ignition timing are calculated on the basis of the required amount TQHUKA of air. Thus, after all, the so-called external load read in advance is reflected by the secondary correction amount QHUKA2 of air or the correction amount AHUKA of the ignition timing. Therefore, even if the external load changes abruptly and greatly, it is possible to prevent the phenomenon of hunting, namely, fluctuations in engine speed, and to perform control in such a manner as to stabilize the engine speed.

Figure 4:
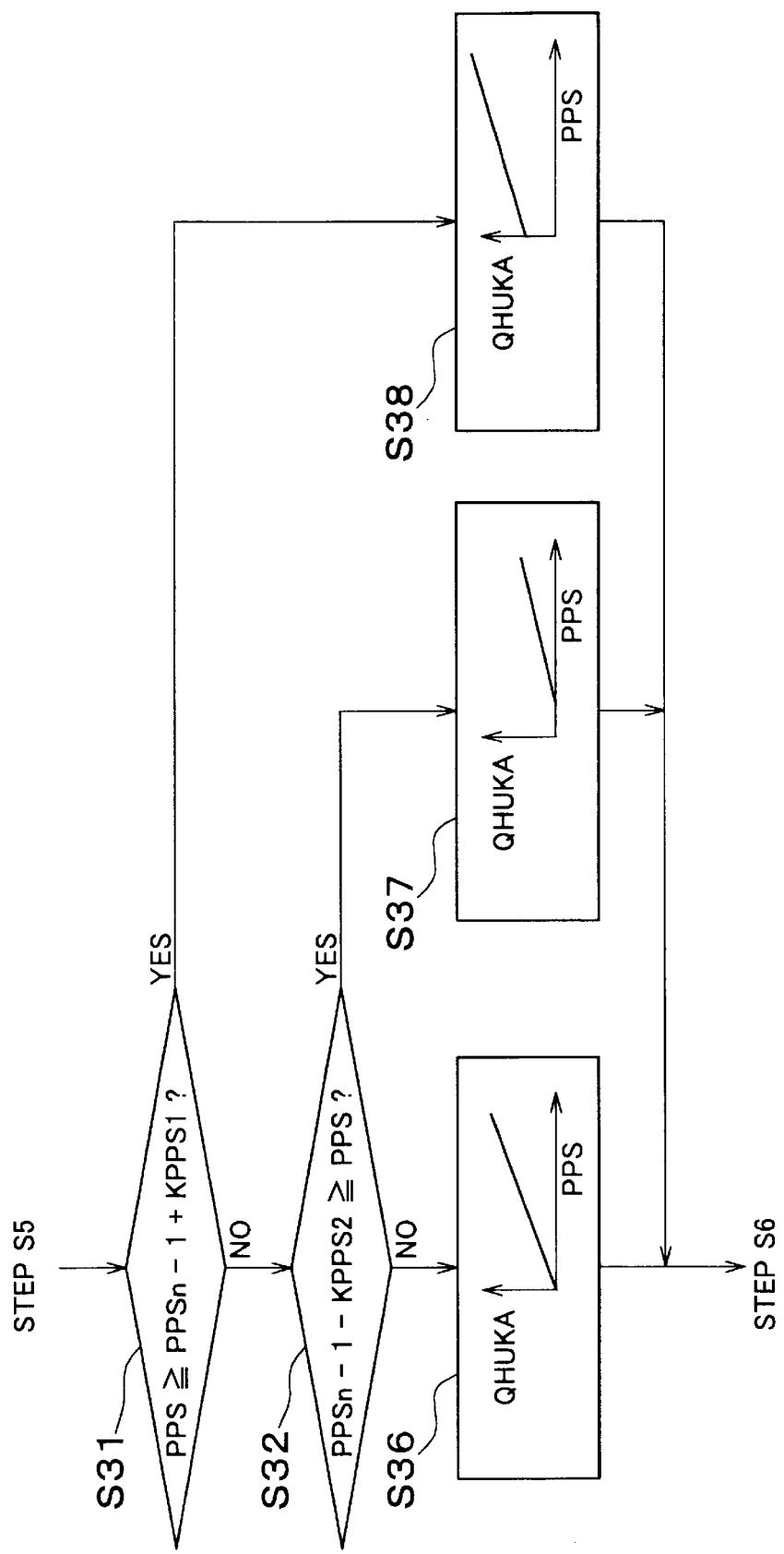
FIG. 4 is a partial flowchart of the control routine shown in FIG. 1, illustrating another example in which calculation of a primary correction amount of air is made differently depending on whether the magnitude of changes in external load is great or small.

If the external load changes greatly, it is also possible to calculate the correction amount of air through direct use of the external load instead of calculating the correction amount QHUKA of air through calculation of the aforementioned load value tPPS for calculation. FIG. 4 shows such an example. In the example shown in FIG. 4, the aforementioned steps S33 to S35 shown in FIG. 3 are modified. This is a control example designed to calculate the correction amount QHUKA of air on the basis of maps that are prepared individually for the case where the change in the hydraulic pressure PPS as an external load is small, the case where the hydraulic pressure PPS as an external load has decreased greatly, and the case where the hydraulic pressure PPS as an external load has increased greatly.

To be more precise, if the result in the aforementioned step S32 is negative because of a small change in the hydraulic pressure PPS, the correction amount QHUKA of air is calculated (step S36) on the basis of a map that is set such that the correction amount QHUKA of air increases substantially in proportion to the hydraulic pressure PPS. On the other hand, if the result in the aforementioned step S32 is positive because of a substantial drop in the hydraulic pressure PPS, the correction amount QHUKA of air is calculated (step S37) on the basis of a map that is set such that the correction amount QHUKA of air based on the external load becomes relatively small. Furthermore, if the result in step S31 is positive because of a substantial increase in the hydraulic pressure PPS, the correction amount QHUKA of air is calculated (step S38) on the basis of a map that is set such that the correction amount QHUKA of air based on an external load becomes relatively large.

The required amount TQHUKA of air, the convergence speed NEY, and the secondary correction amount QHUKA2 of air are calculated on the basis of the primary correction amount QHUKA of air thus calculated. Therefore, as in the case of performing the aforementioned control on the basis of FIG. 3, it is possible to prevent the phenomenon of hunting of the control for stabilizing the engine speed and to suppress or eliminate fluctuations in engine speed.

Figure 5:
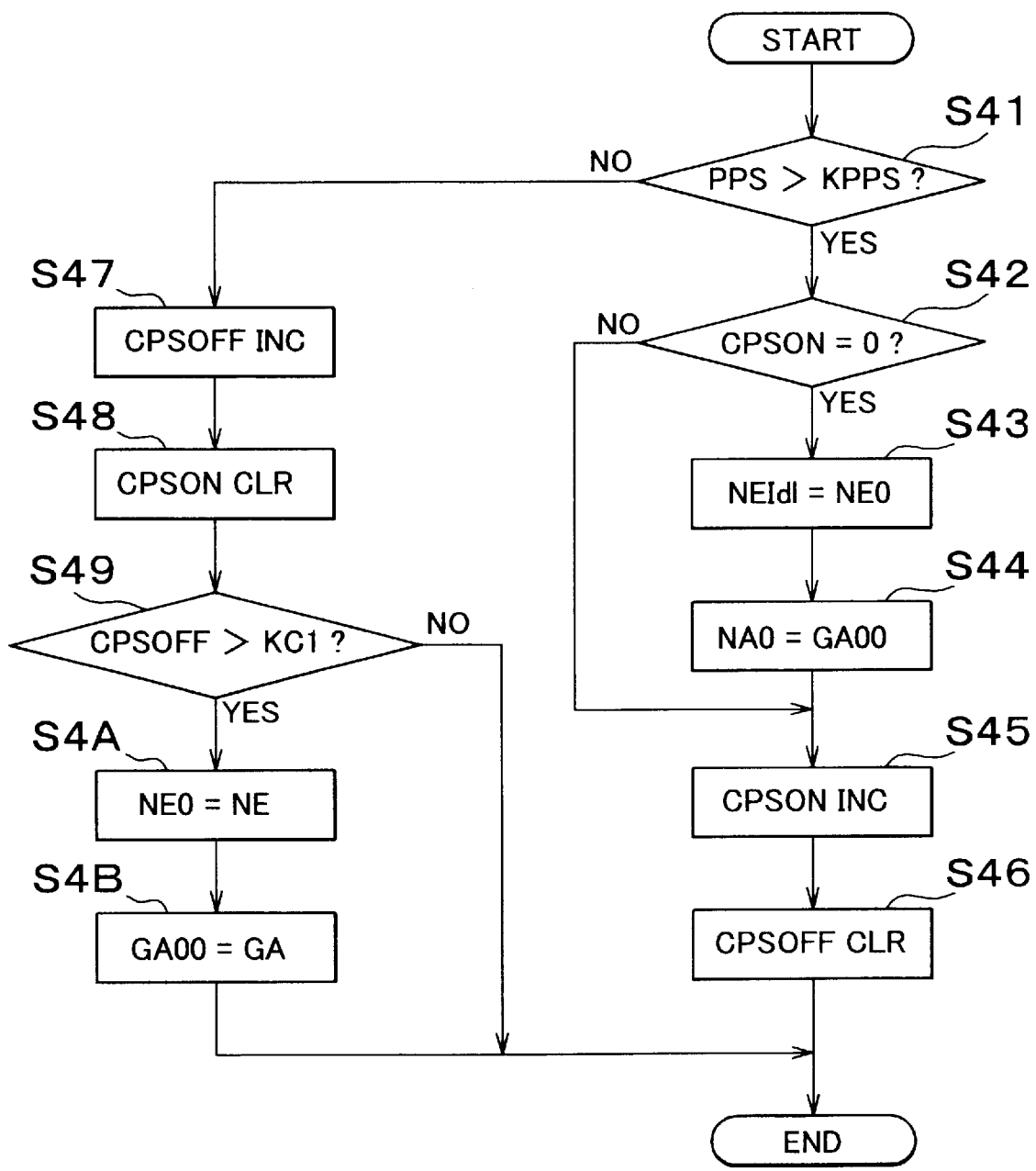
FIG. 5 is a flowchart illustrating a control example in which reference values for engine speed and intake air amount are set.

So-called secondary correction of the amount of air is controlled on the basis of a difference from a target value of the amount of air or the engine speed as described above. Thus, if the setting of the target value is far from an actual state of the engine 1, there arises an error in correcting the amount of air. This example applies, for example, to a case where the external load is repeatedly turned on and off within a short period. Because the influence of previous correction control of the amount of air remains, it is preferable to perform control in consideration of such an influence. To be more precise, it is preferable to perform control with a stabilized engine speed immediately before generation of an external load or an amount of intake air in that state being set as a target value. FIG. 5 shows such an example.

The routine shown in FIG. 5 can be executed between steps S4 and S5 in the flowchart shown in FIG. 1. It is determined whether or not the hydraulic pressure PPS of the power steering pump 5 as an external load is higher than a predetermined reference value KPPS (step S41). The result in step S41 is positive if an external load is generated. In such a case, it is determined whether or not an ON counter CPSON indicates zero (step S42).

The ON counter CPSON is a counter for counting the lapse of time since generation of an external load. Thus, if the count value is zero and if the result in step S42 is positive, the state immediately before the determination in step S42 is a steady state where no external load is generated, namely, a state where the engine speed NE has been stabilized. Thus, the reference speed NE0 immediately before generation of an external load is stored as the idle speed NEidl (step S43). Further, an amount GA00 of intake air detected in such a steady state is stored as the reference amount GA0 of air (step S44).

Then, the ON counter CPSON is incremented (INC) (step S45). The count value of an OFF counter CPSOFF, which starts counting if the hydraulic pressure PPS as an external load is equal to or lower than the reference value KPPS, is cleared (CLR) (step S46). If the result in step S42 is negative on the ground that the ON counter CPSON has already started counting time, the process proceeds to step S45 immediately without updating the idle speed NEIdl or the reference amount GA0 of air.

On the other hand, if the result in step S41 is negative on the ground that the hydraulic pressure PPS as an external load is equal to or lower than the reference value KPPS, the OFF counter CPSOFF is incremented (step S47) and the count value of the ON counter CPSON is cleared (step S48). In addition, it is determined whether or not the count value of the OFF counter CPSOFF is greater than a criterion time KC1 (steps S4 and S9).

If the result in step S49 is negative, the process slips out of the present routine without performing any specific control. On the contrary, if the result in step S49 is positive, there has been a state where no external load is generated, namely, a state where the hydraulic pressure PPS is equal to or lower than the reference value KPPS for a period of a measurable length. Thus, in this case, the engine speed NE at that moment, namely, at the moment when a predetermined time has elapsed since the turnoff of the external load is stored as the reference speed NE0 in a steady state (step S4A). Furthermore, the amount GA of intake air at that moment is stored as the amount GA00 of air in the steady state (step S4B).

Thus, the control shown in FIG. 5 is designed to adopt values at the moment immediately before generation of an external load as the reference amount GA0 and the idle speed NEIdl, which are used to calculate the secondary correction amount QHUKA2 of air. Therefore, it is possible to perform correction control of the amount of air while reflecting or considering a state immediately before generation of the external load. Hence, even if the external load is turned on and off repeatedly, it is possible to stabilize the engine speed at a target engine speed. Further, even if the engine speed is relatively high, for example, during fast idling, the engine speed can be stabilized at the target engine speed.

Figure 6:
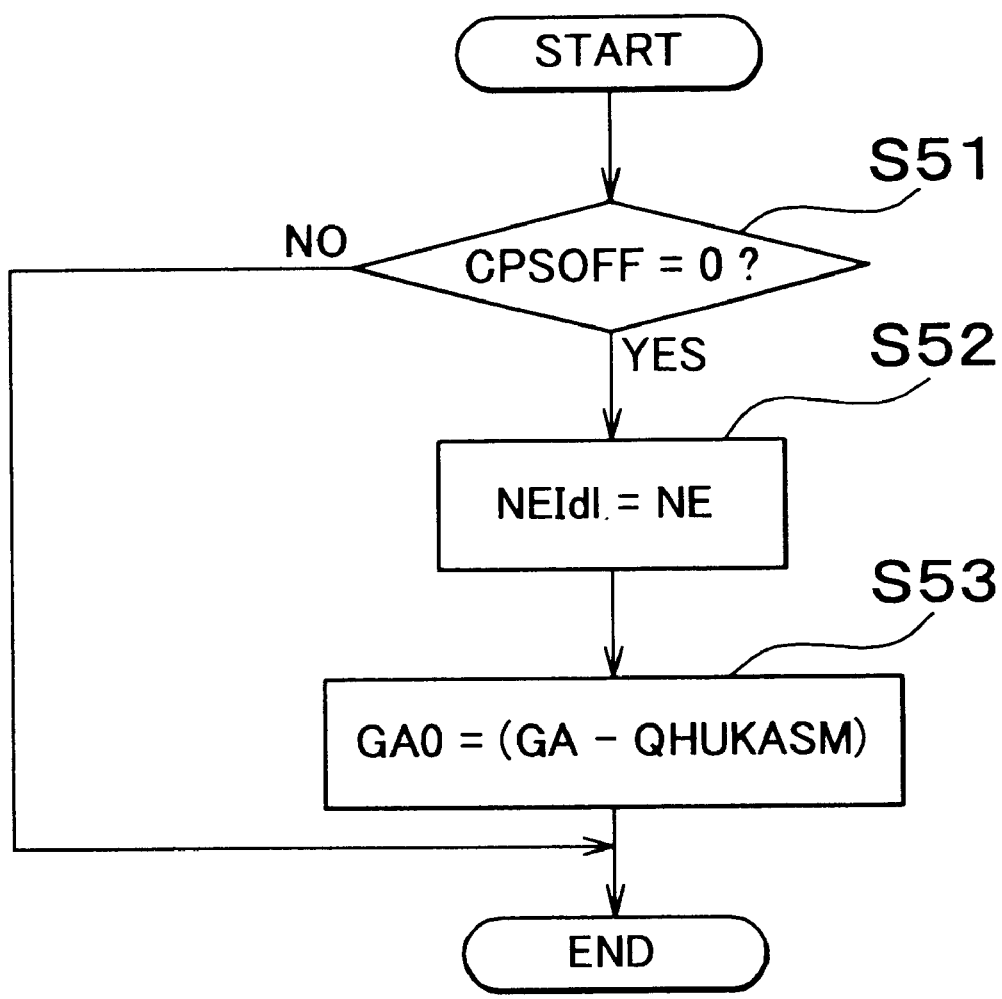
FIG. 6 is a flowchart illustrating another control example in which reference values for engine speed and intake air amount are set.

If the external load is eliminated, it is possible to perform control as shown in FIG. 6 while considering the influence of correction corresponding to the external load. The control shown in FIG. 6 is designed to be performed between steps S41 and S47 in the flowchart shown in FIG. 5. If the result in step S41 of FIG. 5 is negative on the ground that the hydraulic pressure PPS is equal to or lower than the reference value KPPS, it is determined whether or not the OFF counter CPSOFF is zero (step S51). If the result in step S51 is negative on the ground that the OFF counter CPSOFF is unequal to zero, a certain length of time has elapsed since the turnoff of the external load. Thus, the process slips out of the routine shown in FIG. 6.

On the other hand, if the result in step S51 is positive on the ground that the OFF counter CPSOFF is zero, the external load has been turned off. Thus, in this case, the engine speed NE at that moment is regarded as a target and stored as the idle speed NEIdl (step S52). Further, the amount of air obtained by subtracting an amount QHUKASAM of air corresponding to an amount for correcting the load from the amount GA of intake air at that moment is stored as the reference amount GA0 of air (step S53). It is to be noted herein that the value integrated as the sum of amounts of intake air corrected in the control shown in FIG. 1 on the basis of the external load (hydraulic pressure PPS) that has just been eliminated can be adopted as the amount QHUKASAM of air corresponding to the amount for correcting the load.

Thus, if the control shown in FIG. 6 is performed in combination with the control shown in FIGS. 5 and 1, the amount of intake air (i.e. the engine output) is controlled upon elimination of the external load with the amount of air obtained through subtraction of an amount of air corresponding to the engine speed at that moment or the external load being set as a target value. As a result, even if the engine speed has been increased for one reason or another, it is possible to perform control while setting the engine speed as a target. Thus, the engine speed can be stabilized.

The aforementioned control shown in FIG. 5 is designed to perform control with a steady state immediately before generation of an external load or a steady state after elimination of the external load being set as a target state. In performing this control, if those steady states are states in the course of a change, it is probable that correction of the amount of air will suffer an error as a result of the change. An example of such a change is a change in the amount of intake air or the fast idling speed resulting from changes in temperature.

The control example shown in FIG. 7 is designed to eliminate the influence of changes in the amount of intake air resulting from the fast idling speed or the temperature. FIG. 7 illustrates the contents of control to be performed after the aforementioned steps S4B and S46 shown in FIG. 5. First of all, an actual amount GA of intake air at a timing when a predetermined time has elapsed since elimination of an external load is stored as the amount GA00 of air in a steady state (step S4B). Then, a fast idling speed FI at that moment is stored (stored value: NFI) (step S61). Further, an increase QTHW in the amount of intake air based on the temperature at that moment is stored (stored value: QTHWO) (step S62).

On the other hand, after the aforementioned OFF counter CPSOFF is cleared in step S46 on the ground that the hydraulic pressure PPS as an external load is higher than the reference value KPPS, the engine speed obtained by subtracting the stored fast idle speed NFI and the fast idle speed FI corresponding to a temperature at that moment from the reference speed NE0 in a state where no external load is generated is set as a target idle speed NEIdl (step S63). Further, the amount of air obtained by subtracting the stored increase QTHWO in the amount of intake air and the increase QTHW in the amount of air which is determined on the basis of a temperature at that moment from the reference amount GA00 of air in a state where no external load is generated is set as the reference amount GA0 of air in a state where there is no external load (step S64). The increase QTHW in the amount of air and the fast idle speed FI corresponding to the temperature THW of engine coolant are as shown in diagrams below the flowchart shown in FIG. 7, and thus can be calculated on the basis of the detected temperature THW of engine coolant.

Thus, even if an external load is generated or eliminated in a state where the engine speed is changing, for example, during racing, the control is performed as shown in FIG. 7, so that the amount of intake air is corrected with a state after termination of racing being set as a target state. Therefore, erroneous correction can be prevented, and the property of convergence of the engine speed to the idle speed is improved.

In order to eliminate the influence on correction of the load ascribable to unstableness of the engine speed during racing or the like, it is appropriate that the data in the unstable state be not captured as the data for control. Thus, as shown in FIG. 8, it is preferable to detect an unstable state of the engine speed NE even in an idling state and then to adopt control in which the reference speed NE0 is not updated.

Figure 8:
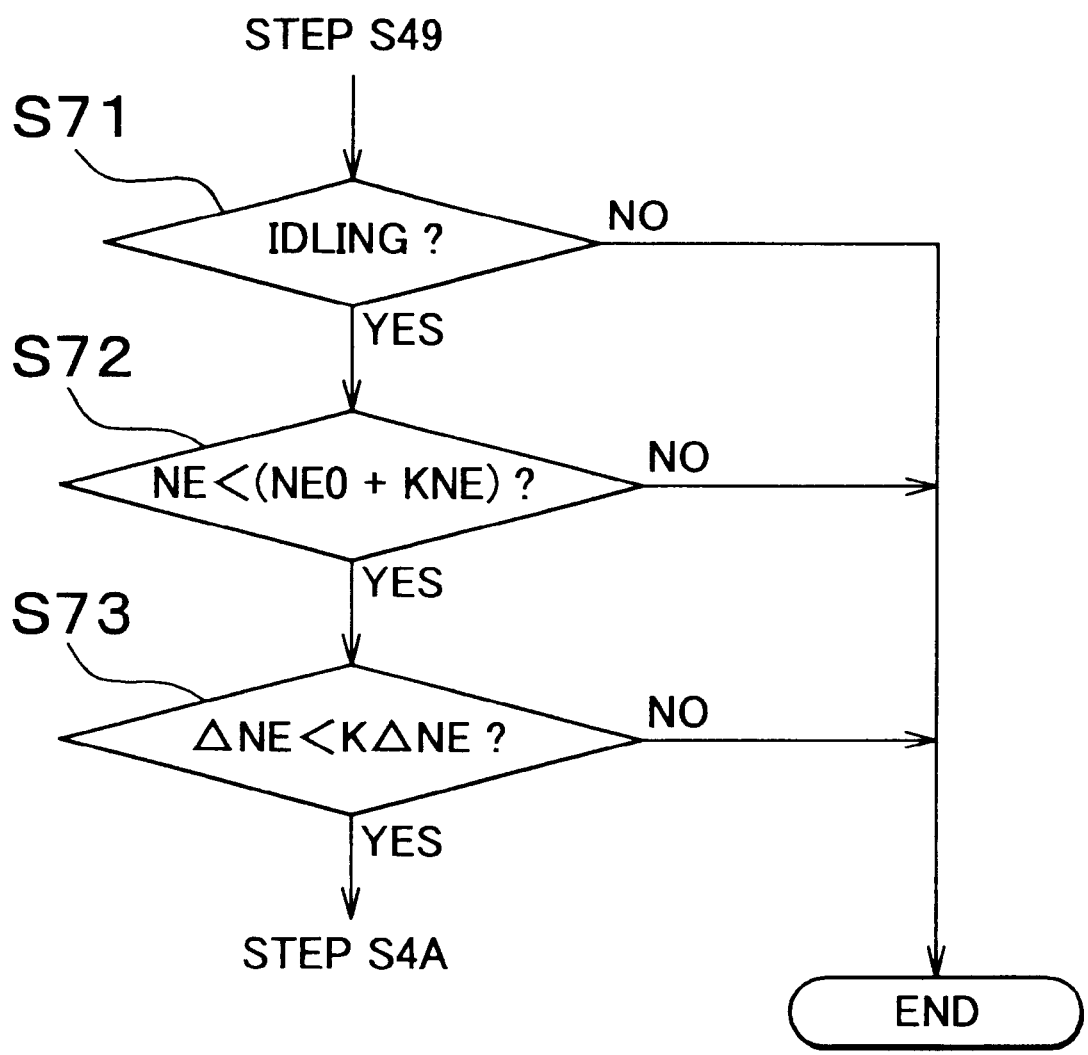
FIG. 8 is a partial flowchart of the routine shown in FIG. 5, illustrating a control example in which the updating of a target engine speed is withheld when the engine speed is unstable.

The control shown in FIG. 8 is performed between steps S49 and S4A in the flowchart shown in FIG. 5. If the result in step S49 is positive on the ground that the count value of the OFF counter CPSOFF is greater than a criterion value KCI, it is determined whether or not the engine is in an idling state (step S71). This determination can be made on the basis of the opening of the accelerator, the vehicle speed, the temperature of engine coolant, the external load or the like.

If the result in step S71 is negative on the ground that the engine is not in an idling state, the routines shown in FIGS. 5 and 8 are terminated. If the result in step S71 is positive, it is determined whether or not the engine speed NE is lower than a rotational speed obtained by adding the criterion value KNE to the reference speed NE0 in a state where the external load is OFF (step S72). If the engine speed NE is high, the result in step S72 is positive. In such a case, the present routine is terminated. On the contrary, if the result in step S72 is positive on the ground that the engine speed NE is close to the reference speed NE0, it is determined whether or not the amount ΔNE of change in the engine speed NE is smaller than a criterion reference value ΔKNE (step S73). If the result in step S73 is negative on the ground that the change ΔNE in the engine speed NE is great, the present routine is terminated. On the contrary, if the result in step S73 is positive on the ground that the change ΔNE in the engine speed NE is small, the process proceeds to the aforementioned steps S4A and S4B where the reference speed NE0 and the reference amount GA00 of air in a state where there is no external load are updated.

That is, if the engine speed NE is a high speed equal to or higher than a predetermined value despite an idling state or if the engine speed NE is unstable, performance of the control shown in FIG. 8 prevents the engine speed or the amount of intake air in that state from being captured as the reference values. As a result, idle speed control is free from the influence of an unstable state of the engine speed NE. Thus, it is possible to prevent erroneous correction in the case where an external load is generated and to improve the property of convergence of the engine speed to the idle speed.

Figure 9:
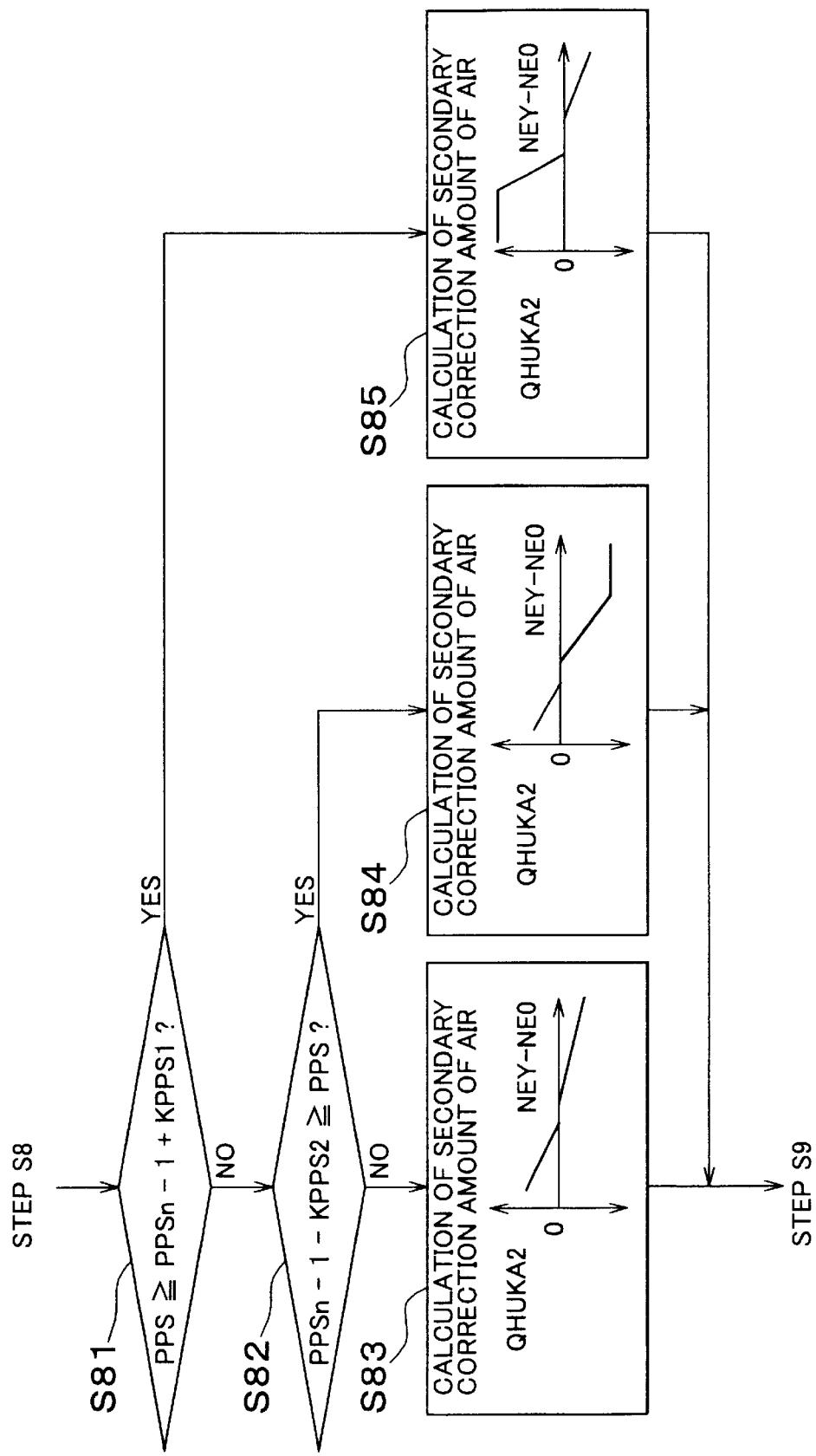
FIG. 9 is a partial flowchart of the routine shown in FIG. 1, illustrating a control example in which a secondary correction amount of air is set in accordance with the magnitude of changes in external load.

The aforementioned control example is designed such that the amount of intake air is subjected to secondary correction on the basis of a difference between the estimated speed NEY and the idle speed NEIdl which is estimated to be generated at the next timing (step S9). Instead, it is also possible to calculate the secondary correction amount QHUKA2 of air for each state of the external load. FIG. 9 shows such an example. The flowchart shown in FIG. 9 is performed instead of step S9 shown in FIG. 1 or 2.

In FIG. 9, if the power steering pump 5 is turned on and an external load is generated, it is determined whether or not the hydraulic pressure PPS that is detected at intervals of a cycle time for performing correction of the amount of air on the basis of the external load is greater than the last value PPSn−1 by the predetermined value KPPS1 or more, namely, whether or not the detected hydraulic pressure PPS is equal to or higher than a pressure obtained by adding the predetermined value KPPS1 to the last-detected hydraulic pressure PPSn−1 (step S81). If the result in step S81 is negative, namely, if the increase in the hydraulic pressure PPS during the aforementioned cycle time is smaller than the predetermined value KPPS1, it is determined whether or not the detected hydraulic pressure PPS is lower than the last-detected hydraulic pressure PPSn−1 by the predetermined value KPPS2 or more, namely, whether or not the detected hydraulic pressure PPS is equal to or lower than a pressure obtained by subtracting the predetermined value KPPS2 from the last-detected hydraulic pressure PPSn−1 (step S82).

If the result in step S82 is negative, the amount of change in the hydraulic pressure PPS as an external load is within a range defined by the aforementioned two predetermined values KPPS1 and KPPS2, and the change in external load is relatively small. In such a case, as in the case of the control in the aforementioned step S9, the secondary correction amount QHUKA2 of air is calculated on the basis of a difference between the estimated speed NEY and the reference speed NE0 (step S83). FIG. 9 schematically shows an example of the map.

On the other hand, if the aforementioned result in step S82 is positive because of a substantial drop in the hydraulic pressure PPS, the secondary correction amount QHUKA2 of air is calculated such that the secondary correction amount QHUKA2 of air which is calculated on the basis of a difference between the estimated speed NEY and the reference speed NE0 becomes a negative value, on the basis of a map that is set in such a manner as to match the control characteristics in the case where the amount of air is corrected to be reduced (step S84). FIG. 9 schematically shows an example of such a map.

In addition, if the result in step S81 is positive because of a substantial increase in the hydraulic pressure PPS, the secondary correction amount QHUKA2 of air is calculated such that the secondary correction amount QHUKA2 of air which is calculated on the basis of a difference between the estimated speed NEY and the reference speed NE0 becomes a positive value, on the basis of a map that is set in such a manner as to match the control characteristics in the case where the amount of air is corrected to be increased (step S85). FIG. 9 schematically shows an example of such a map.

Thus, the control shown in FIG. 9 is designed to subject the amount of intake air to so-called secondary correction in accordance with an increase in external load, a decrease in external load, and an intermediate state therebetween, respectively. Thus, major correction for giving priority to the property of convergence of the engine speed to the idle speed and minor correction for suppressing the phenomenon of hunting can be carried out depending on the circumstances. Consequently, stability of the engine speed is improved.

Figure 10:
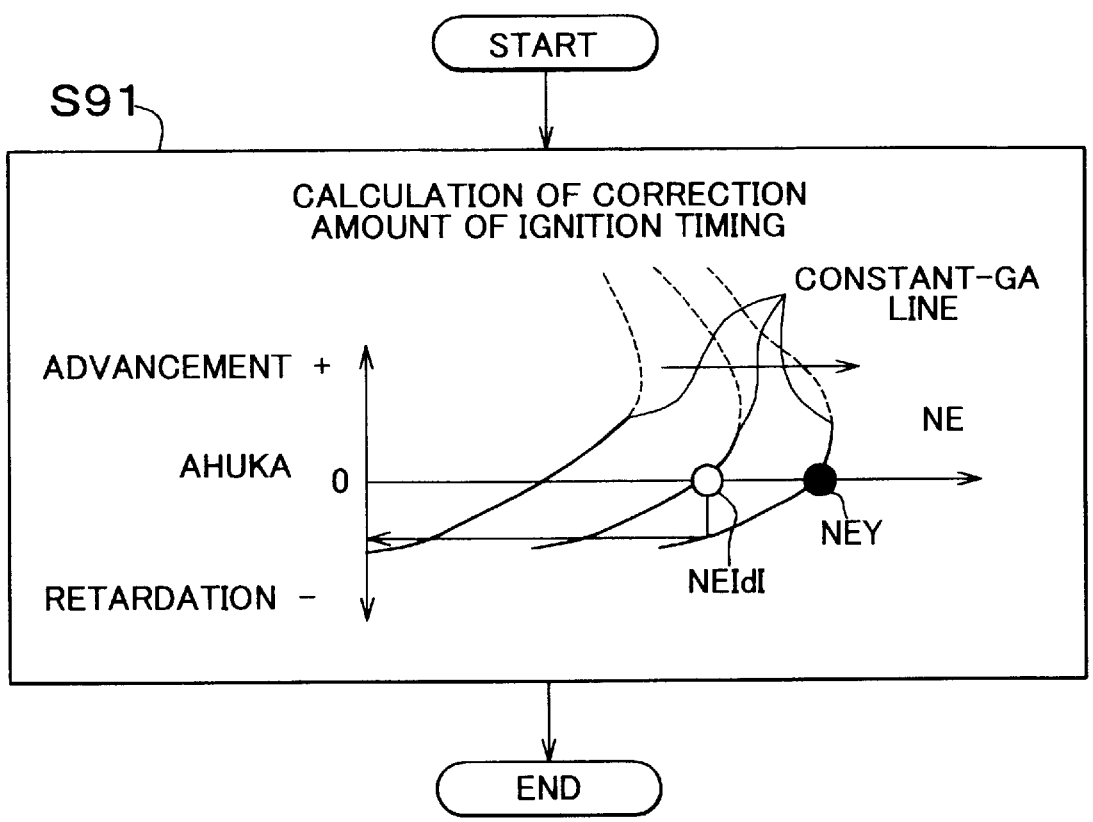
FIG. 10 is a partial flowchart of the routine shown in FIG. 1, illustrating a control example in which calculation of a correction amount of ignition timing is made from an estimated speed and an amount of intake air.

The control example shown in FIG. 1 is designed to perform correction for retarding or advancing the ignition timing so as to suppress fluctuations in engine speed ascribable to the external load, on the basis of a difference between the estimated speed NEY and the idle speed NEIdl (step S10). Instead, it is also possible to calculate the correction amount of the ignition timing from the engine speed and the amount of air. FIG. 10 shows such an example. This is an example of control that is performed instead of the aforementioned step S10 in FIG. 1.

That is, in FIG. 10, an experiment or the like is conducted using the engine concerned so as to find a relation among the engine speed NE, the amount GA of air, and the correction amount AHUKA of the ignition timing. Calculation of a correction amount of the ignition timing is made on the basis of the data prepared in advance and of a relation among the estimated speed NEY, the amount GA of air, and the target idle speed NEIdl (step S91). To be more precise, the example shown in FIG. 10 indicates that the hydraulic pressure PPS as an external load has been turned off. First of all, a point corresponding to the idle speed NEIdl is taken on the side of retardation on a constant-air-amount line (constant-GA line) where the correction amount of the ignition timing is zero and where the engine speed NE passes through a point corresponding to the estimated speed NEY. The amount of retardation corresponding to that point is adopted as the correction amount AHUKA of the ignition timing.

Because the control shown in FIG. 10 makes it possible to control correction of the ignition timing on the basis of data that have been obtained through actual operation of the engine 1, precision in correcting the ignition timing is improved. Consequently, it is possible to more effectively suppress or prevent fluctuations in the engine speed. Further, since correction of the ignition timing in step S10 of FIG. 1 or step S91 of FIG. 10 is performed in conjunction with the aforementioned so-called secondary correction of the amount of intake air, it is possible to compensate for a delay in the amount of air by correcting the engine torque through correction of the ignition timing. As a result, it is possible to effectively suppress or prevent transient fluctuations in the engine speed resulting from changes in the external load. At the same time, the engine stall resistance in an idling state is improved so that the idle speed can be reduced. Thus, it is possible to improve fuel consumption. In addition, since the control width of torque is enlarged, it is possible to effectively suppress or prevent fluctuations in the engine speed even if the external load changes in a composite manner.

Furthermore, it is also possible to perform correction of the ignition timing instead of so-called secondary correction of the amount of air. For example, when the amount of air is large, a high torque sensitivity can be achieved by correcting the ignition timing rather than correcting the amount of air. Therefore, it is preferable to correct the torque in response to the turnoff of an external load by performing correction in such a manner as to retard the ignition timing. Thereby it becomes possible to effectively suppress or prevent the engine speed from changing as a result of fluctuations in external load.

Figure 11:
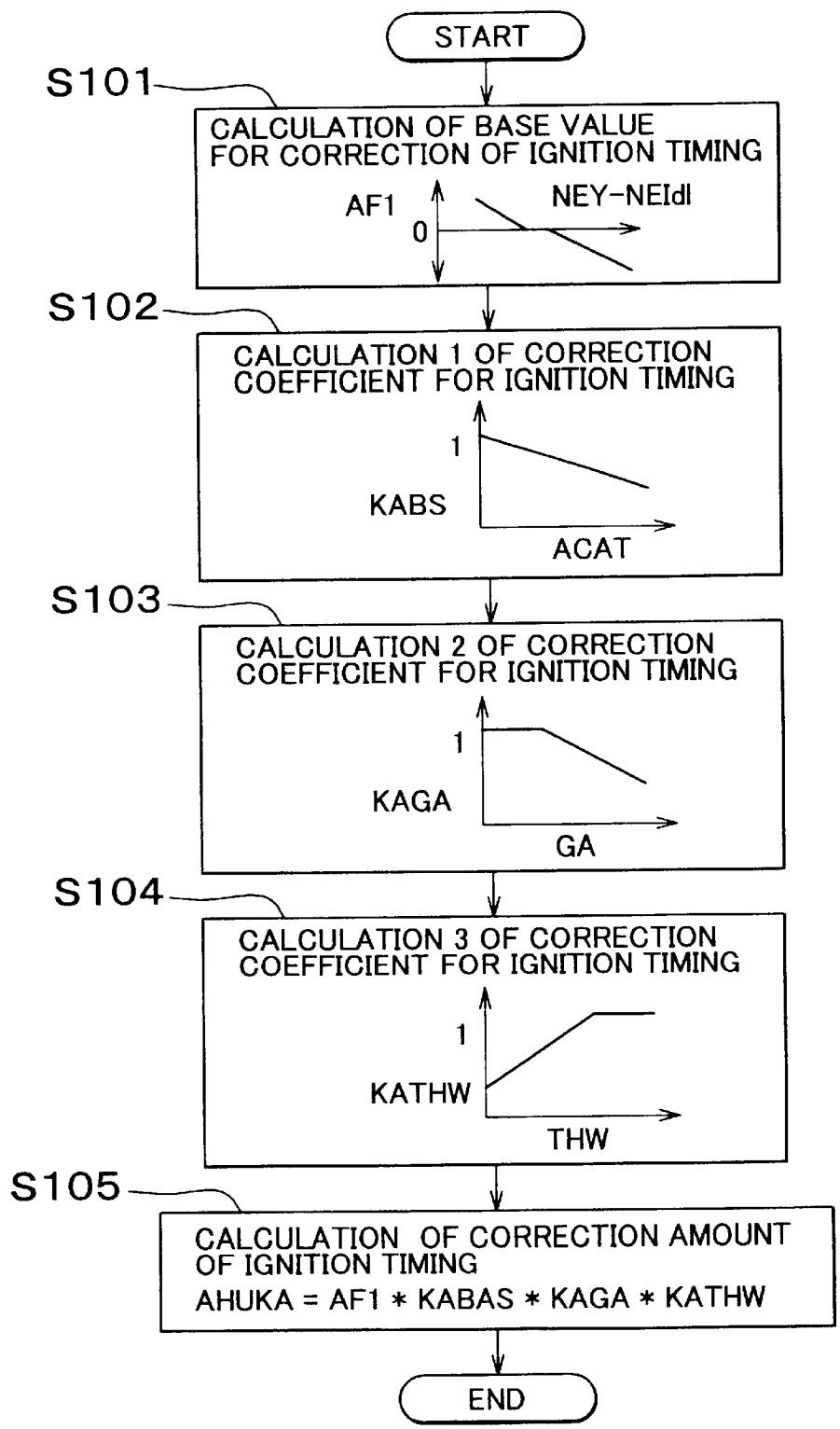
FIG. 11 is a flowchart illustrating an example of correction control in which correction of an ignition timing overlaps with correction based on other factors.

The ignition timing of the engine 1 exerts an influence on the property of exhaust gas and on the engine torque, and thus is corrected by various factors. Thus, if correction of the ignition timing for control of the transient engine torque resulting from the aforementioned change in external load overlaps with correction of the ignition timing based on other factors, the ignition timing is corrected excessively. This may cause a change in engine speed. FIG. 11 shows a control example for obviating such a situation. This control can be performed instead of step S10 shown in FIG. 1.

To be more precise, calculation of a base value AF1 for correction of the ignition timing is first of all made (step S101). The base value AF1 can be calculated from a map on the basis of a difference between the idle speed NEIdl and the estimated speed (convergence speed) NEY calculated in the aforementioned step S8. This also holds true for the control in the aforementioned step S10.

As a coefficient for correcting the base value AF1 for correction of the ignition timing, calculation of a correction coefficient KABS on the basis of an amount ACAT of retardation that is carried out to warm up the exhaust gas purification catalyst is first of all made (step S102). That is, in order to heat up the exhaust gas purification catalyst to an activation temperature, control is performed in such a manner as to retard the ignition timing immediately after the engine 1 is started and to activate the reaction of oxidation in the exhaust gas purification catalyst with the intention of raising the temperature thereof. If control associated with the external load is performed in an overlapping manner in such a case, the amount of retardation becomes excessive. The correction coefficient KABS is set as a value, which is smaller than "1", that decreases in proportion to an increase in the amount ACAT of retardation for warming up the catalyst. The correction coefficient KABS can be calculated as a concrete value on the basis of a map. FIG. 11 schematically shows an example of such a map.

Further, the torque sensitivity resulting from correction of the amount of air is enhanced in proportion to an increase in the amount of intake air. In order to prevent the change in torque from becoming excessive in the case where the ignition timing is corrected at the same time, calculation of a correction coefficient KAGA on the basis of the amount of air is made (step S103). To be more precise, the correction coefficient KAGA, which is smaller than "1", is set as a value that decreases in proportion to an increase in the amount GA of air. The correction coefficient KAGA can be calculated as a concrete value on the basis of a map. FIG. 11 schematically shows an example of such a map.

Furthermore, if the temperature of intake air rises in accordance with the temperature THW of engine coolant, the intake air increases in volume and causes a decrease in the density of oxygen. Therefore, the correction amount of the ignition timing is increased. Thus, calculation of a correction coefficient KATHW is made on the basis of the temperature THW of engine coolant (step S104). That is, the correction coefficient KATHW is set as a value that approaches "1" as the temperature THW of engine coolant rises. Alternatively, the correction coefficient KATHW is set as "1". The correction coefficient KATHW can be calculated as a concrete value on the basis of a map. FIG. 11 schematically shows an example of such a map.

Then, the correction amount AHUKA for the ignition timing is calculated by multiplying the base value AF1 for correction of the ignition timing by the aforementioned respective correction coefficients KABS, KAGA and KATHW (step S105). Thus, if the ignition timing is corrected by the correction amount AHUKA of the ignition timing thus calculated, the correction amount for redressing a delay of response in the amount of air associated with fluctuations in the external load does not simply overlap with the correction amount based on other factors. Consequently, it becomes possible to make correction of the ignition timing appropriate, and thus to correct the ignition timing by an exact amount and stabilize the engine speed.

Figure 12:
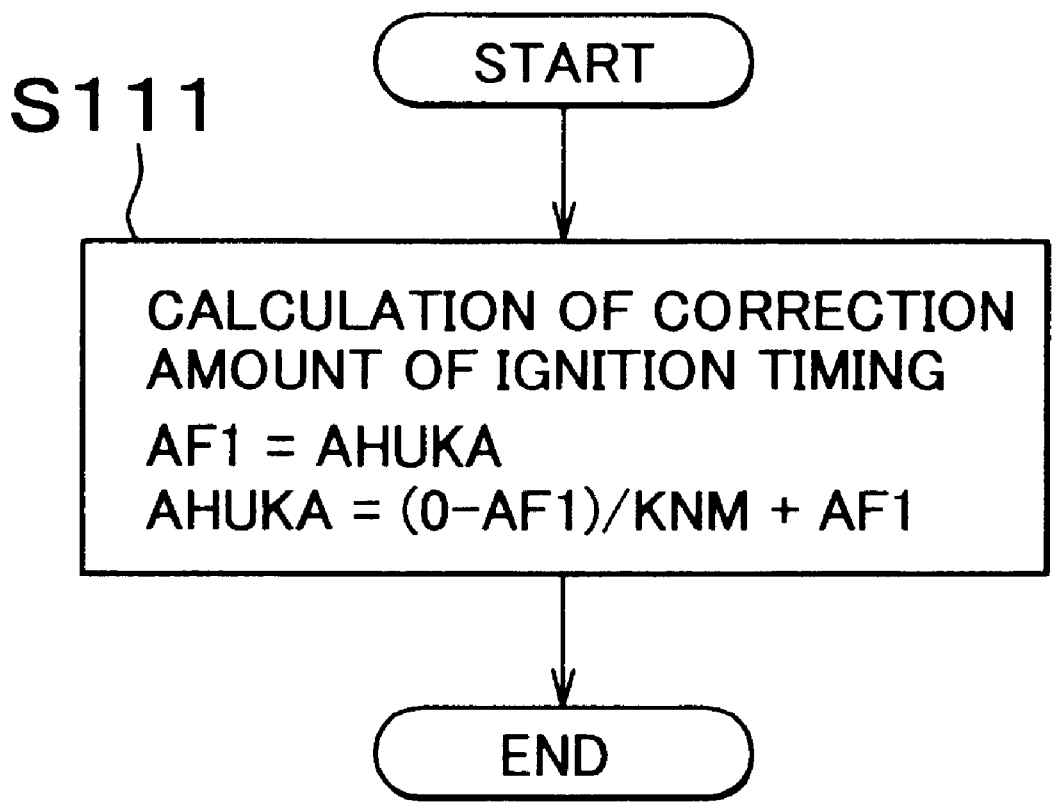
FIG. 12 is a partial flowchart of the routine shown in FIG. 1, illustrating an example of normalizing control in the case where correction of an ignition timing is terminated.

It is to be noted herein that the engine torque changes as a result of a change in the ignition timing. Thus, if the aforementioned correction amount of the ignition timing is immediately set as zero on the ground that the external load has been eliminated, the change in engine torque emerges as a shock. In order to eliminate such an inconvenience, it is preferable that the change in ignition timing in canceling correction of the ignition timing be subjected to so-called normalizing control. FIG. 12 shows such an example. The step S111 shown in FIG. 12 can be substituted for the aforementioned step S12 shown in FIG. 1.

To be more precise, the correction amount AHUKA for the ignition timing at that moment is held as the base value AF1 for correction of the ignition timing. Further, the correction amount AHUKA of the ignition timing is calculated as a correction amount that is obtained by dividing the base value AF1 for correction of the ignition timing held at that moment by a predetermined value KNM and subtracting the quotient from the base value AF1 for correction of the ignition timing at that moment. That is, the correction amount of the ignition timing is reduced each time by a value obtained by dividing a difference from "0" by the predetermined value KNM. Thus, if the correction amount of the ignition timing is reset as "0" due to elimination of the external load, the ignition timing changes gradually. Consequently, it becomes possible to reduce changes in engine torque and prevent a shock.

Figure 13:
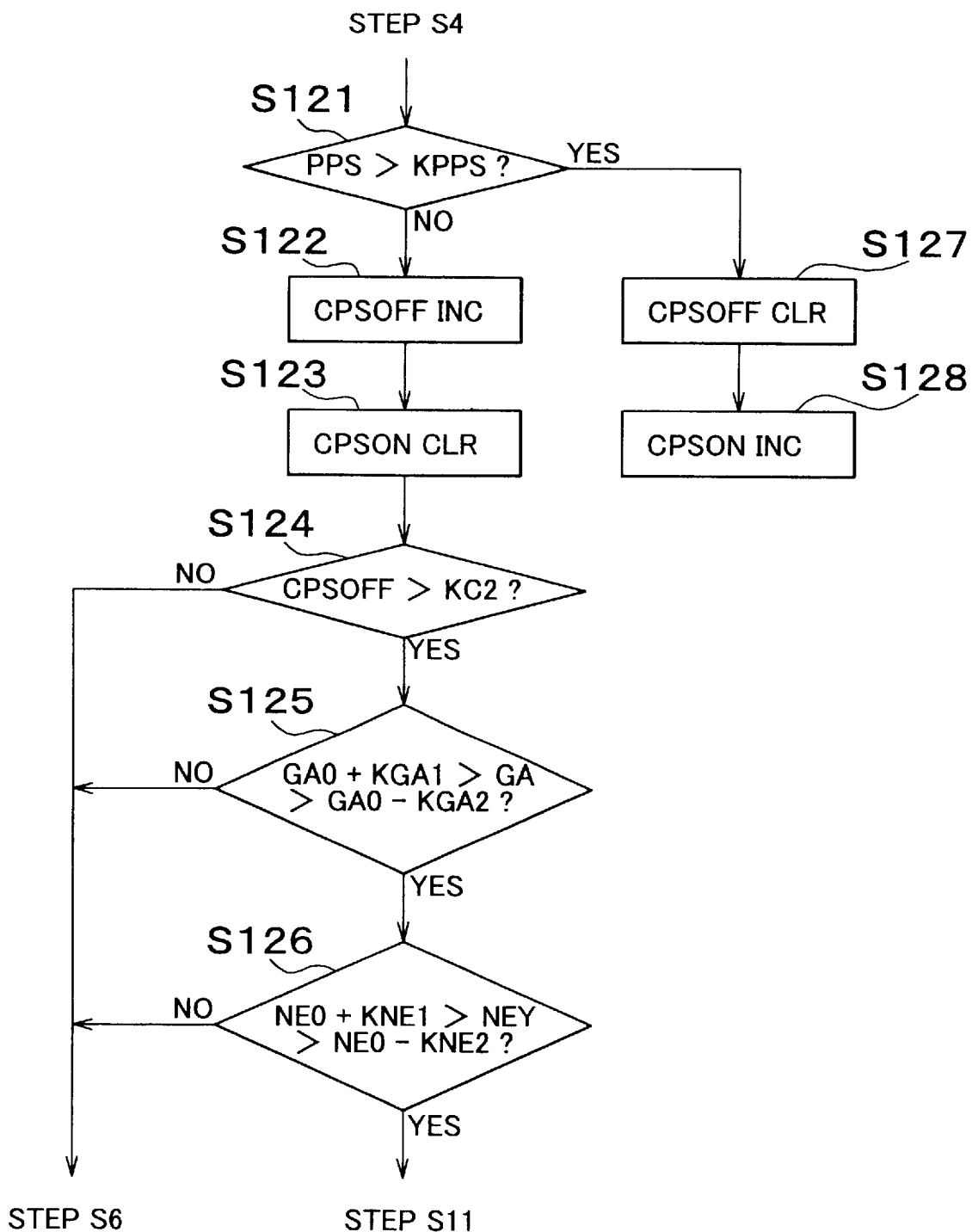
FIG. 13 is a partial flowchart of the routine shown in FIG. 1, illustrating an example of a routine for inferring the influence of an external load.

During the aforementioned control of the amount of intake air, a delay resulting from the volume of the intake pipe 2 or the like occurs not only in the case where the amount of intake air is increased but also in the case where the amount of intake air is reduced. Thus, if correction of the amount of intake air is canceled due to a decrease in the external load or due to elimination of the external load, it is preferable to continue to perform control while taking into account a delay of response in the amount of air until a predetermined time elapses since a decrease in the external load or elimination of the external load. That is, in the aforementioned step S5 shown in FIG. 1, it is preferable to determine that there is an influence of the external load until a predetermined time elapses or a predetermined change in state occurs since the turnoff of the external load, and to continue to perform correction control. FIG. 13 shows an example of such a determination on continuation of correction control. The routine shown in FIG. 13 can be executed instead of step S5 in FIG. 1. First of all, it is determined whether or not the hydraulic pressure PPS as an external load is higher than a criterion value KPPS (step S121). If the external load decreases or is eliminated, the hydraulic pressure PPS becomes equal to or lower than the criterion value KPPS. Thus, the result in step S121 is then determined as negative, and the OFF counter CPSOFF is incremented (step S122). Further, the ON counter CPSON is cleared (step S123).

It is then determined whether or not the count value of the OFF counter CPSOFF is greater than a predetermined criterion reference value KC2 (step S124). The OFF counter CPSOFF is designed to count the elapsed time since a timing when the hydraulic pressure PPS as an external load decreases to become equal to or lower than the criterion value KPPS, namely, the elapsed time since a decrease in the external load or elimination thereof. Thus, if the elapsed time is equal to or smaller than the criterion reference value KC2, the elapsed time since elimination of the external load is short and there remains an influence of the correction amount of intake air. Therefore, the process proceeds to the aforementioned step S6 where correction of the amount of intake air is continued.

On the other hand, if the result in step S124 is positive on the ground that the elapsed time since elimination of the external load has exceeded the criterion reference value KC2, it is determined whether or not the engine has returned to a state where the amount of intake air is free from the influence of correction (step S125). That is, it is determined whether or not the actual amount GA of intake air at that moment is within a predetermined range stretching around the reference amount GA0 of air at the time when there is no external load, namely, whether or not the difference from the reference amount GA0 of air is within a predetermined range. This determination can be made, for example, by determining whether or not the actual amount GA of intake air is smaller than a value obtained by adding a predeter- mined value KGA1 to the reference amount GA0 of air and greater than a value obtained by subtracting a predetermined value KGA2 from the reference amount GA0 of air.

If the result is negative in step S125, the actual amount GA of intake air at that moment has not returned to the reference amount GA0 of air and there remains an influence of previous correction. Thus, the process proceeds also herein to the aforementioned step S6 where correction of the amount of intake air is continued. On the contrary, if the result in step S125 is positive, it is determined whether or not the estimated speed NEY at that moment has returned to a state free from the influence of correction (step S126). That is, it is determined whether or not the estimated speed NEY at that moment is within a predetermined range stretching around the reference speed NE0 at the time when there is no external load, namely, whether or not the difference from the reference speed NE0 is within a predetermined range. This determination can be made, for example, by determining whether or not the estimated speed NEY is smaller than a value obtained by adding a predetermined value KNE1 to the reference speed NE0 and greater than a value obtained by subtracting a predetermined value KNE2 from the reference speed NE0.

If the result in step S126 is negative, the estimated speed NEY at that moment has not returned to the reference speed NE0 and there remains an influence of previous correction. Thus, the process proceeds also herein to the aforementioned step S6 where correction of the amount of intake air is continued. On the other hand, if the result in step S126 is positive, it can be determined that correction based on the external load does not exert an influence on control of the actual amount of intake air or on the engine speed NE. Thus, the process proceeds to the aforementioned step S11 where base data are stored.

Thus, the control shown in FIG. 12 can suppress or eliminate a delay of response in correction of the amount of intake air when correction of the amount of intake air is canceled after elimination of the external load, thus making it possible to stabilize the engine speed.

It is to be noted herein that an external load is generated through operation of the power steering pump 5, the compressor 6 for the air-conditioner or the like and that the external load is eliminated through stoppage of the operation. Therefore, the external load may change within a relatively short period. In such a case, if secondary correction of the amount of intake air for a previous change in external load has been continued, secondary correction of intake air for a subsequent change in external load may be affected. In order to eliminate such an inconvenience, it is appropriate that the amount of intake air be subjected to so-called secondary correction only for a predetermined period after detection of a great change in external load.

Figure 14:
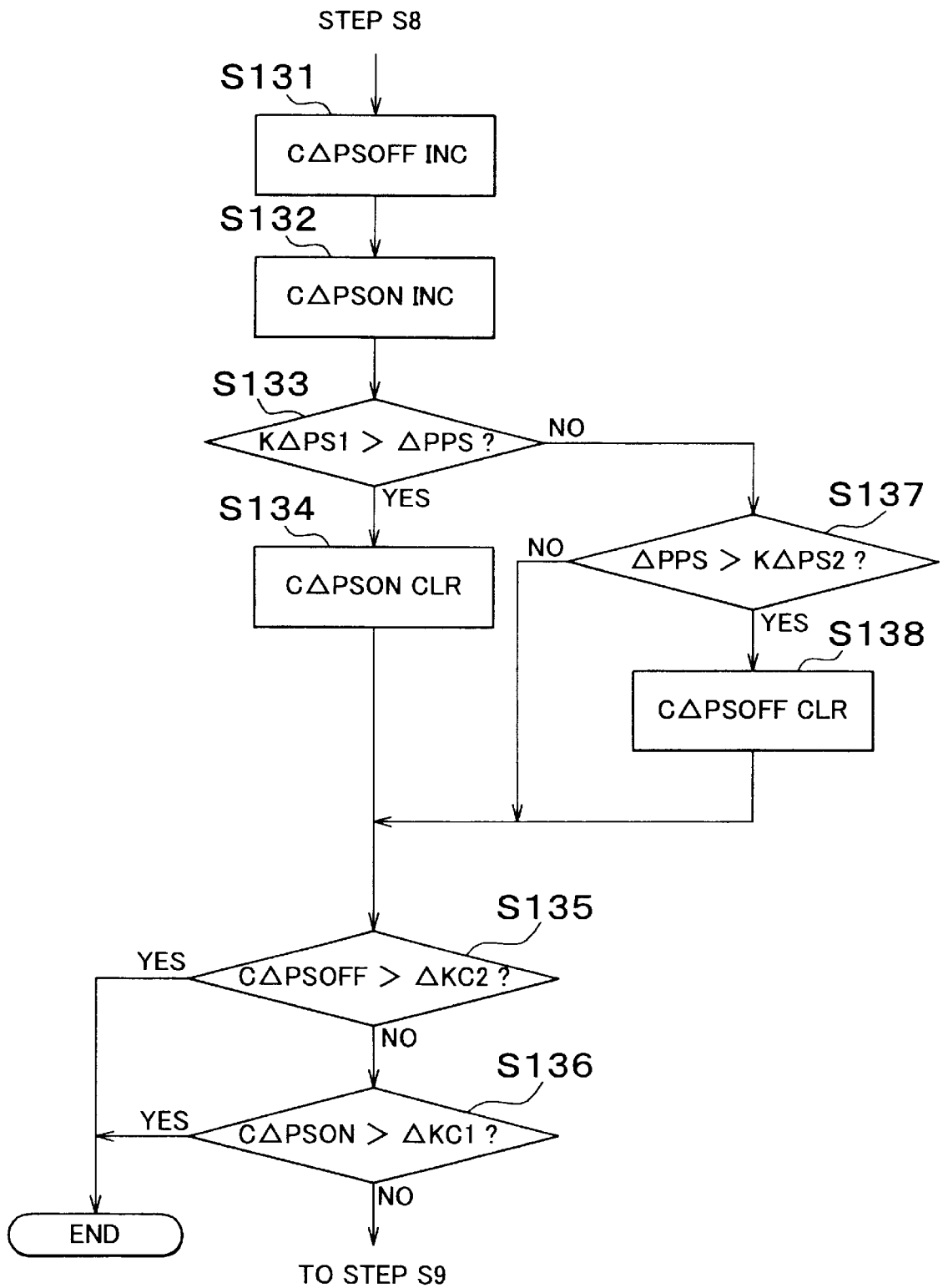
FIG. 14 is a partial flowchart of the routine shown in FIG. 1, illustrating a control example in which the amount of intake air is subjected to secondary correction only for a predetermined period following detection of a great change in external load.

FIG. 14 shows such a control example. The routine shown in FIG. 14 is executed before step S9 shown in FIG. 1. To be more precise, an OFF counter CΔPSOFF, which counts time if the hydraulic pressure PPS as an external load changes in a decreasing direction, is incremented (step S131). Also, an ON counter CΔPSON, which counts time if the hydraulic pressure PPS as an external load changes in an increasing direction, is incremented (step S132). It is then determined whether or not the amount ΔPPS of change in the hydraulic pressure PPS is smaller than a predetermined criterion value KΔPS1, namely, whether or not the hydraulic pressure PPS has dropped substantially (step S133).

If the result in step S133 is positive because of a substantial drop in the hydraulic pressure PPS, the ON counter CΔPSON is cleared (step S134). It is then determined whether or not the count value of the OFF counter CΔPSOFF is greater than the criterion reference value KC2 (step S135). If the result in step S135 is positive, a long time has elapsed since a substantial drop in the hydraulic pressure PPS as an external load. In such a case, the aforementioned routines shown in FIGS. 1 and 14 are terminated. That is, the amount of intake air is not subjected to so-called secondary correction.

On the other hand, if the result in step S135 is negative, a short time has elapsed since a substantial drop in the hydraulic pressure PPS as an external load. In this case, it is determined whether or not the count value of the ON counter CΔPSON is greater than another criterion reference value KC1 (step S136). Because the count value of the ON counter CΔPSON has already been cleared in step S134, the result in step 136 is negative. Thereafter the process proceeds to step S9 shown in FIG. 1 so that the amount of intake air is subjected to secondary correction.

On the other hand, if the result in step S133 is negative on the ground that the amount ΔPPS of change in the hydraulic pressure PPS is equal to or higher than a criterion value KΔPS1, it is determined whether or not the amount ΔPPS of change in the hydraulic pressure PPS is greater than another criterion value KΔPS2, namely, whether or not the hydraulic pressure PPS has increased substantially (step S137). If the result in step S137 is positive on the ground that the hydraulic pressure PPS has changed substantially in an increasing direction, the OFF counter CΔPSOFF is cleared (step S138). The process then proceeds to the aforementioned step S135. Because the OFF counter CΔPSOFF has already been cleared, the result in step S135 is negative. Thus, it is subsequently determined whether or not the count value of the ON counter CΔPSON, namely, the elapsed time since a substantial change in the hydraulic pressure PPS as an external load in an increasing direction is greater than the criterion reference value KC1 (step S136).

Because a short time has elapsed immediately after a substantial change in the hydraulic pressure PPS, the result in step S136 is negative. In such a case, the process proceeds to step S9 shown in FIG. 1 so that the amount of intake air is subjected to so-called secondary correction. On the other hand, if the result in step S136 is positive on the ground that a long time has elapsed since a substantial change in the hydraulic pressure PPS, the aforementioned routines shown in FIGS. 1 and 14 are terminated. That is, the amount of intake air is not subjected to so-called secondary correction.

The state where the result in the aforementioned step S137 is negative is a state where the amount ΔPPS of change in the hydraulic pressure PPS as an external load is substantial neither in an increasing direction nor in a decreasing direction. In this case, the process proceeds to step S135 without clearing any of the counters CΔPSON and CΔPSOFF. Accordingly, the result in step S135 or step S136 is positive on the ground that the counter CΔPSON or CΔPSOFF assumes a great count value. As a result, the amount of intake air is not subjected to so-called secondary correction.

Thus, the aforementioned control shown in FIG. 14 is designed to subject the amount of intake air to so-called secondary correction only for a predetermined period after a substantial change in the hydraulic pressure PPS as an external load so as to redress a delay of change in the amount of air resulting from so-called primary correction. As a result, even in the case where the external load changes again within a short period, it is possible to correct the amount of intake air in accordance with a subsequent change in external load, and thus to stabilize the engine speed effectively.

Figure 15:
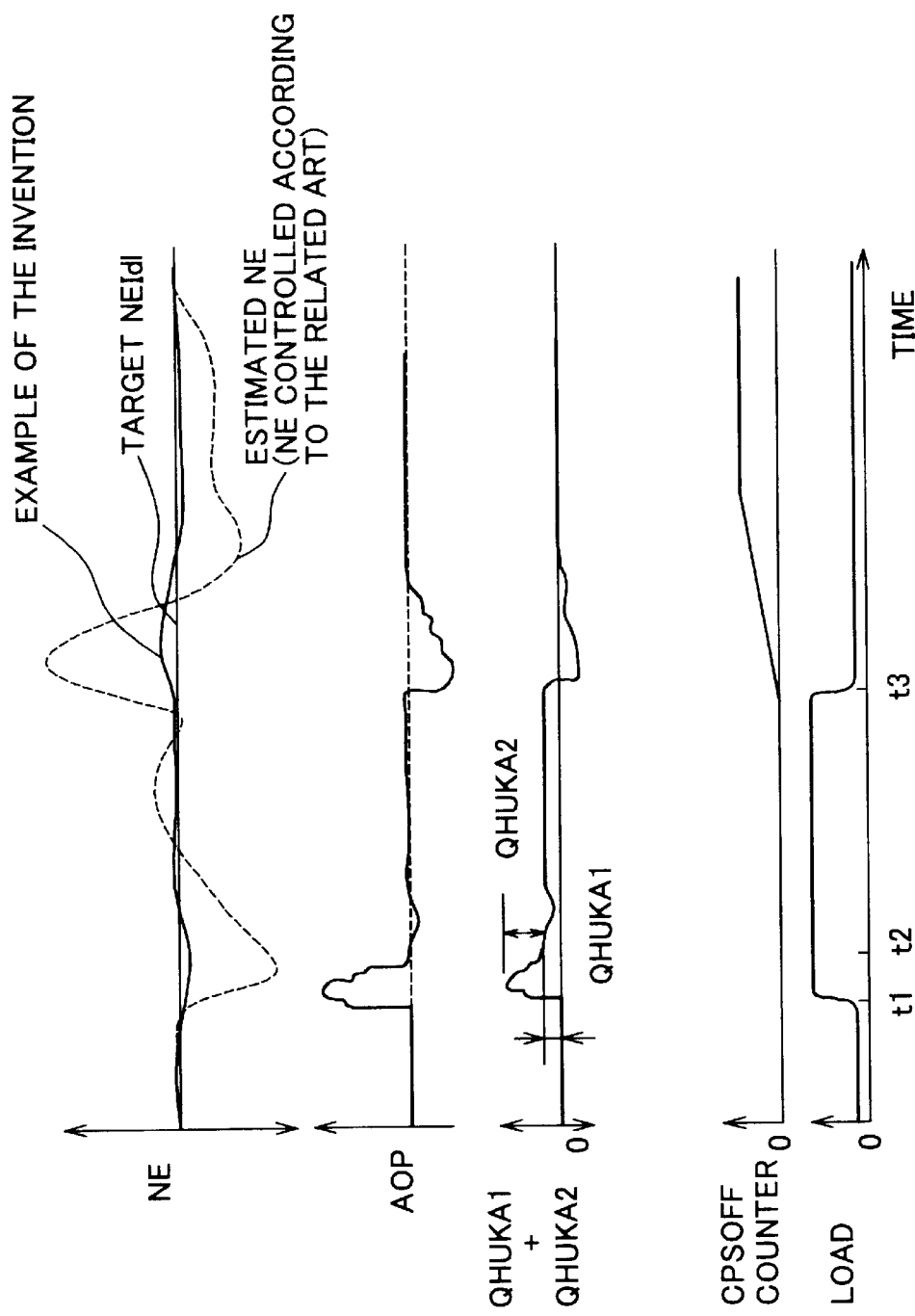
FIG. 15 is a time diagram illustrating changes in engine speed during control by the device of the invention in conjunction with changes in engine speed during control based on the related art.

FIG. 15 is a time diagram illustrating how the external load, the OFF counter CPOFF, the sum of the correction amounts (QHUKA1+QHUKA2) of air, the ignition timing AOP, and the engine speed NE change in the case where the control device of the invention subjects the amount of intake air to primary correction and secondary correction while correcting the ignition timing in response to a change in external load. That is, if an external load (e.g. the hydraulic pressure PPS of the power steering pump) is generated at a timing tl, the primary correction amount QHUKA1 and the secondary correction amount QHUKA2 are almost immediately set as the correction amounts of intake air. At the same time, the ignition timing is subjected to correction for advancement, so that the ignition timing AOP is advanced. Thereafter the difference between the estimated speed NEY and the idle speed NEIdl becomes smaller, whereby the secondary correction amount QHUKA2 of intake air gradually decreases. The correction amount of air coincides with the primary correction amount QHUKA1 of air at a timing t2. In parallel, the amount of advancement of the ignition timing is gradually reduced to zero. Consequently, the engine speed drops slightly and is stabilized at the idle speed immediately.

Further, if the hydraulic pressure PPS as an external load drops at a timing t3, namely, if the external load is eliminated, the amount of intake air is immediately subjected to primary correction and secondary correction while the ignition timing is corrected so as to be retarded. The difference between the estimated speed NEY and the idle speed NEIdl becomes smaller, whereby the correction amount of air is gradually returned to zero. That is, the correction amount of air is returned to the reference amount of air before generation of the external load. In parallel therewith, the amount of retardation of the ignition timing is returned to zero. Because the aforementioned normalizing control is performed in such a case, the ignition timing AOP gradually recovers to a value free from the correction for retardation. As a result, the engine torque changes gently enough to avoid a shock. Thus, the engine speed NE increases slightly and is then stabilized at the target idle speed NEIdl.

For comparison, FIG. 15 illustrates with a dotted line how the engine speed NE (corresponding to the aforementioned estimated speed NEY) changes according to the related art, namely, how the engine speed NE changes in the case where the amount of intake air is not subjected to secondary correction and where the ignition timing is not corrected. That is, the control of the related art suffers great fluctuations in the engine speed NE and the undesirable property of convergence to the target idle speed NEIdl. As a result, the engine comes into a stall if the idle speed is lowered. Further, an increase in the engine speed leads to a deterioration in fuel consumption.

The aforementioned concrete examples handle a construction in which the electronic throttle valve controls the amount of intake air so as to control the idle speed. It is to be noted, however, that the invention is not limited to the aforementioned concrete examples and that the invention is also applicable to an internal combustion engine designed such that an idle speed control valve (ISC valve) disposed in parallel with a throttle valve controls the amount of intake air. Further, the aforementioned concrete examples are designed to retard or advance the ignition timing so as to change the engine torque temporarily. However, it is also possible to adopt a construction in which the amount of fuel supply is changed instead of or in parallel with such retardation or advancement of the ignition timing so that the output torque of the internal combustion engine is increased or reduced temporarily.

What is claimed is:

1. An idle speed control device for an internal combustion engine which controls an idle speed of the internal combustion engine by at least one of an amount of intake air and an ignition timing during application of an external load, comprising:
   a controller that is designed:
      to determine a target amount of intake air corrected on the basis of the external load;
      to estimate a transient speed of the internal combustion engine at a certain timing when changing the amount of intake air to the target amount of intake air; and
      to correct the amount of intake air or to correct the ignition timing on the basis of a difference between the estimated speed and the actual speed of the internal combustion engine at the certain timing, in such a manner as to reduce the difference.

2. The control device according to claim 1, wherein:
the controller estimates the transient speed of the internal combustion engine on the basis of the target amount of intake air, the actual amount of intake air at the timing, and a target idle speed.

3. The control device according to claim 2, wherein:
the controller sets an engine speed at a state without the external load as the target idle speed.

4. The control device according to claim 3, wherein:
the controller sets an engine speed at a state without the external load and without a change in a speed of the internal combustion engine as the target idle speed.

5. The control device according to claim 3, wherein:
the controller updates the target amount of intake air and the target idle speed if the speed of the internal combustion engine is stable.

6. The control device according to claim 2, wherein:
the controller sets an engine speed at a timing when the external load is switched from on to off as the target idle speed; and
sets an amount of intake air obtained by subtracting an amount of air corresponding to correction of the load from the amount of intake air at the timing as the target amount of air.

7. The control device according to claim 1, wherein:
the controller sets a target torque corresponding to the external load and estimates the transient speed of the internal combustion engine on the basis of the target torque and an actual amount of intake air at the certain timing.

8. The control device according to claim 1, wherein:
the controller calculates the target amount of air corresponding to an external load at a timing that is preceded by a timing of detection of an external load by a predetermined time, on the basis of an amount of change in external load.

9. The control device according to claim 1, wherein:
the controller continues to correct the amount of intake air or to correct the ignition timing until a predetermined time elapses or a predetermined change in state occurs after when the external load is switched from on to off.

10. The control device according to claim 1, wherein:
the controller corrects the amount of intake air for a predetermined period after a change of the external load when a change amount of the external load is a predetermined amount or more at least.

11. The control device according to claim 1, wherein:
the external load is a hydraulic pressure generated from an external apparatus acting on the speed of the internal combustion engine.

12. The control device according to claim 1, wherein:
the controller retards the ignition timing when reducing an output torque of the internal combustion engine.

13. An idle speed control device for an internal combustion engine which controls an idle speed of the internal combustion engine by at least one of an amount of intake air and an ignition timing during application of an external load, comprising:
   a controller that is designed:
      to calculate a target amount of intake air corrected on the basis of the external load;
      to estimate a transient speed of the internal combustion engine at a certain timing when changing the amount of intake air to a target amount of air; and
      to correct the ignition timing on the basis of the estimated speed and an amount of intake air at the timing, in such a manner as to suppress an increase in the speed of the internal combustion engine.

14. An idle speed control device for an internal combustion engine which controls an idle speed of the internal combustion engine by at least one of an amount of intake air and an ignition timing during application of an external load, comprising:
   target air amount setting means for calculating a target amount of intake air corrected on the basis of the external load;
   speed estimation means for estimating a transient speed of the internal combustion engine at a certain timing when changing the amount of intake air to the target amount of air; and
   correction means for further correcting the amount of intake air or correcting the ignition timing on the basis of a difference between the estimated speed and an actual speed of the internal combustion engine at the timing, in such a manner as to reduce the difference.

15. A method of controlling an idle speed of an internal combustion engine in which control of an idle speed of the internal combustion engine is performed by at least one of an amount of intake air and an ignition timing during application of an external load, comprising the steps of:
   determining a target amount of intake air corrected on the basis of the external load;
   estimating a transient speed of the internal combustion engine at a certain timing when changing the amount of intake air to the target amount of air; and
   correcting the amount of intake air or correcting the ignition timing on the basis of a difference between the estimated speed and an actual speed of the internal combustion engine at the timing, in such a manner as to reduce the difference.

16. The method according to claim 15, wherein:
the engine speed estimating step estimates the transient speed of the internal combustion engine on the basis of the target amount of air, the actual amount of intake air at the timing, and a target idle speed.

17. The method according to claim 15, wherein:
the engine speed estimating step set a torque corresponding to the external load and estimates the transient speed of the internal combustion engine on the basis of the target torque and the actual amount of intake air at the timing.

18. The method according to claim 15, wherein:
the ignition timing is retarded when reducing an output torque of the internal combustion engine.

* * * * *